US012777435B2

(12) United States Patent
Laehteensuo et al.

(10) Patent No.: US 12,777,435 B2
(45) Date of Patent: Oct. 27, 2026

(54) SYNCHRONIZATION SIGNAL BLOCK (SSB) CONFIGURATION FOR NARROW DEDICATED SPECTRUMS

(71) Applicant: QUALCOMM Incorporated, San Diego, CA (US)

(72) Inventors: Toni Harri Henrikki Laehteensuo, Helsinki (FI); Le Liu, San Jose, CA (US); Alberto Rico Alvarino, San Diego, CA (US); Javier Rodriguez Fernandez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 18/166,212

(22) Filed: Feb. 8, 2023

(65) Prior Publication Data

US 2024/0267856 A1 Aug. 8, 2024

(51) Int. Cl.
*H04W 56/00* (2009.01)
*H04L 5/00* (2006.01)

(52) U.S. Cl.
CPC ......... *H04W 56/001* (2013.01); *H04L 5/0048* (2013.01)

(58) Field of Classification Search
None
See application file for complete search history.

(56) References Cited

U.S. PATENT DOCUMENTS

2009/0185550 A1* 7/2009 Naka .................... H04J 11/0069 370/350
2020/0314778 A1* 10/2020 Jung ..................... H04W 16/14
2024/0291613 A1* 8/2024 Baker .................. H04J 11/0073

OTHER PUBLICATIONS

Nokia (R1-2212397, "support for below 5 MHz BW", Nov. 14-18, 2022) (Year: 2022).*
Nokia., et al., "NR Support for Below 5 MHz BW", 3GPP TSG RAN WG1 #111, R1-2212397, Toulouse (France), Nov. 14-18, 2022, 16 Pages.

* cited by examiner

*Primary Examiner* — Maharishi V Khirodhar
(74) *Attorney, Agent, or Firm* — Norton Rose Fulbright US LLP

(57) ABSTRACT

This disclosure provides systems, methods, and devices for wireless communication that support synchronization signal block (SSB) configuration for narrow spectrum. In a first aspect, a method of wireless communication includes scanning one or more of a plurality of bandwidths to identify a synchronization bandwidth via which a SSB is wirelessly communicated. The plurality of bandwidths includes a first subset of bandwidths and a second subset of bandwidths. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The method further includes receiving the SSB via the synchronization bandwidth. Other aspects and features are also claimed and described.

28 Claims, 9 Drawing Sheets

600

| Frequency Range | Reference Frequency ($SS_{REF}$) | Index (GSCN) | Range of GSCN |
|---|---|---|---|
| 0 – 3000 MHz | N * 1200 kHz + M * 50 kHz, N = 1:2499, M = {1, 3, 5} | 3N + (M – 3)/2 | 2 - 7498 |
| 3000 – 24250 MHz | 3000 MHz + N * 1.44 MHz, N = 0:14756 | 7499 + N | 7499 - 22255 |

610

| NR Operating Band | SS Block SCS | SS Block Pattern | Range of GSCN (First - <Step Size> - Last) |
|---|---|---|---|
| n8 | 15 kHz | Case A | 2318 - <1> - 2395 |
| n26 | 15 kHz | Case A | 2153 - <1> - 2230 |
| n28 | 15 kHz | Case A | 1901 - <1> - 2002 |
| n100 | 15 kHz | Case A | 2303 - <1> - 2307 |

*FIGURE 6*

700

| Frequency Range | Reference Frequency ($SS_{REF}$) | Index (GSCN) | Range of GSCN |
|---|---|---|---|
| 0 – 3000 MHz | 400 MHz + L * 100 kHz | 32000 + L | 32000 – upper bound |
| 3000 – 24250 MHz | 3000 MHz + N * 1.44 MHz, N = 0:14756 | 7499 + N | 7499 - 22255 |

710

| NR Operating Band | SS Block SCS | SS Block Pattern | Range of GSCN (First - <Step Size> - Last) |
|---|---|---|---|
| n8 | 15 kHz | Case A | 36345 - <1> - 36418 |
| n26 | 15 kHz | Case A | 34165 - <1> - 34242 |
| n28 | 15 kHz | Case A | 32904 - <1> - 33006 |
| n100 | 15 kHz | Case A | 37203 - <1> - 37249 |

*FIGURE 7*

800

| Frequency Range | Reference Frequency ($SS_{REF}$) | Index (GSCN) | Range of GSCN |
|---|---|---|---|
| 0 – 3000 MHz | $N_{REF}$ * 5 kHz | $N_{REF}$ | 0 - 599999 |
| 3000 – 24250 MHz | 3000 MHz + N * 1.44 MHz, N = 0:14756 | 600000 + N | 600000 - 614756 |

810

| NR Operating Band | SS Block SCS | SS Block Pattern | Range of GSCN (First - <Step Size> - Last) |
|---|---|---|---|
| n8 | 15 kHz | Case A | 185000 - <20> - 192000 |
| n26 | 15 kHz | Case A | 171800 - <20> - 178800 |
| n28 | 15 kHz | Case A | 151600 - <20> - 160600 |
| n100 | 15 kHz | Case A | 183880 - <20> - 185000 |

*FIGURE 8*

SYNCHRONIZATION SIGNAL BLOCK (SSB) CONFIGURATION FOR NARROW DEDICATED SPECTRUMS

TECHNICAL FIELD

Aspects of the present disclosure relate generally to wireless communication systems, and more particularly, to synchronization signal block (SSB) configurations for narrow dedicated spectrums, such as wireless communication channels having bandwidth that is less than 5 megahertz (MHz). Some features may enable and provide improved communications, including power conservation, improved functionality and flexibility, efficient resource utilization, reduced interference, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

With the introduction of $5^{th}$ Generation (5G) or new radio (NR) networks (sometimes referred to as "5G NR" networks/systems/devices), UEs are able to have higher capability, higher data rates, higher bandwidth, and the like. The techniques of 5G have been implemented for a variety of wireless spectrum in a variety of frequency ranges, including spectrum allocations as small as 5 megahertz (MHz) or greater. As the benefits of 5G networks have been observed, there is increased demand to extend 5G beyond the situations in which it is currently supported. One such demand is by owners of narrower spectrum, such as allocations of less than 5 MHz (e.g., 3 MHz up to 5 MHz). However, because many of the mechanisms and configurations are designed for use with wider spectrum, extending and leveraging 5G techniques into narrower spectra while also remaining compatible with legacy concepts and systems is not a simple matter.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a user equipment (UE). The method includes scanning one or more of a plurality of bandwidths to identify a synchronization bandwidth via which a synchronization signal block (SSB) is wirelessly communicated. The plurality of bandwidths includes a first subset of bandwidths and a second subset of bandwidths. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The method further includes receiving the SSB via the synchronization bandwidth.

In an additional aspect of the disclosure, a UE includes a memory storing processor-readable code and at least one processor coupled to the memory. The at least one processor is configured to execute the processor-readable code to cause the at least one processor to scan one or more of a plurality of bandwidths to identify a synchronization bandwidth via which a SSB is wirelessly communicated. The plurality of bandwidths includes a first subset of bandwidths and a second subset of bandwidths. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. Execution of the processor-readable code further causes the at least one processor to receive the SSB via the synchronization bandwidth.

In an additional aspect of the disclosure, an apparatus includes a memory storing processor-readable code and at least one processor coupled to the memory. The at least one processor is configured to execute the processor-readable code to cause the at least one processor to scan one or more of a plurality of bandwidths to identify a synchronization bandwidth via which a SSB is wirelessly communicated. The plurality of bandwidths includes a first subset of bandwidths and a second subset of bandwidths. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The apparatus further includes a communication interface configured to receive the SSB via the synchronization bandwidth.

In an additional aspect of the disclosure, an apparatus includes means for scanning one or more of a plurality of bandwidths to identify a synchronization bandwidth via which a SSB is wirelessly communicated. The plurality of bandwidths includes a first subset of bandwidths and a second subset of bandwidths. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The apparatus further includes means for receiving the SSB via the synchronization bandwidth.

In an additional aspect of the disclosure, a non-transitory computer-readable medium stores instructions that, when executed by a processor, cause the processor to perform operations. The operations include scanning one or more of a plurality of bandwidths to identify a synchronization bandwidth via which a synchronization signal block (SSB) is wirelessly communicated. The plurality of bandwidths includes a first subset of bandwidths and a second subset of bandwidths. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The operations further include receiving the SSB via the synchronization bandwidth.

In an additional aspect of the disclosure, a method for wireless communication is performed by a base station. The method includes selecting a synchronization bandwidth from one of a first subset of a plurality of bandwidths and a second subset of the plurality of bandwidths based on a comparison of a channel bandwidth of one or more communication channels to be used for wireless communication to a threshold. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The method further includes transmitting a SSB via the synchronization bandwidth.

In an additional aspect of the disclosure, a network entity includes a memory storing processor-readable code and at least one processor coupled to the memory. The at least one processor is configured to execute the processor-readable code to cause the at least one processor to select a synchronization bandwidth from one of a first subset of a plurality of bandwidths and a second subset of the plurality of bandwidths based on a channel bandwidth of one or more communication channels to be used for wireless communication. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. Execution of the processor-readable code further causes the at least one processor to transmit a SSB via the synchronization bandwidth.

In an additional aspect of the disclosure, a network entity includes a memory storing processor-readable code and at least one processor coupled to the memory. The at least one processor is configured to execute the processor-readable code to cause the at least one processor to select a synchronization bandwidth from one of a first subset of a plurality of bandwidths and a second subset of the plurality of bandwidths based on a channel bandwidth of one or more communication channels to be used for wireless communication. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The apparatus further includes a communication interface configured to transmit a SSB via the synchronization bandwidth.

In an additional aspect of the disclosure, an apparatus includes means for selecting a synchronization bandwidth from one of a first subset of a plurality of bandwidths and a second subset of the plurality of bandwidths based on a comparison of a channel bandwidth of one or more communication channels to be used for wireless communication to a threshold. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The apparatus further includes means for transmitting a SSB via the synchronization bandwidth.

In an additional aspect of the disclosure, a non-transitory computer-readable medium stores instructions that, when executed by a processor, cause the processor to perform operations. The operations include selecting a synchronization bandwidth from one of a first subset of a plurality of bandwidths and a second subset of the plurality of bandwidths based on a comparison of a channel bandwidth of one or more communication channels to be used for wireless communication to a threshold. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The operations further include initiating transmission of a SSB via the synchronization bandwidth.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 includes examples of SSB configuration for wider spectrum according to one or more aspects.

FIG. 7 includes examples of SSB configuration for narrow spectrum according to one or more aspects.

FIG. 8 includes additional examples of SSB configuration for narrow spectrum according to one or more aspects.

Like reference numbers and designations in the various drawings indicate like elements.

DETAILED DESCRIPTION

Figure 1:
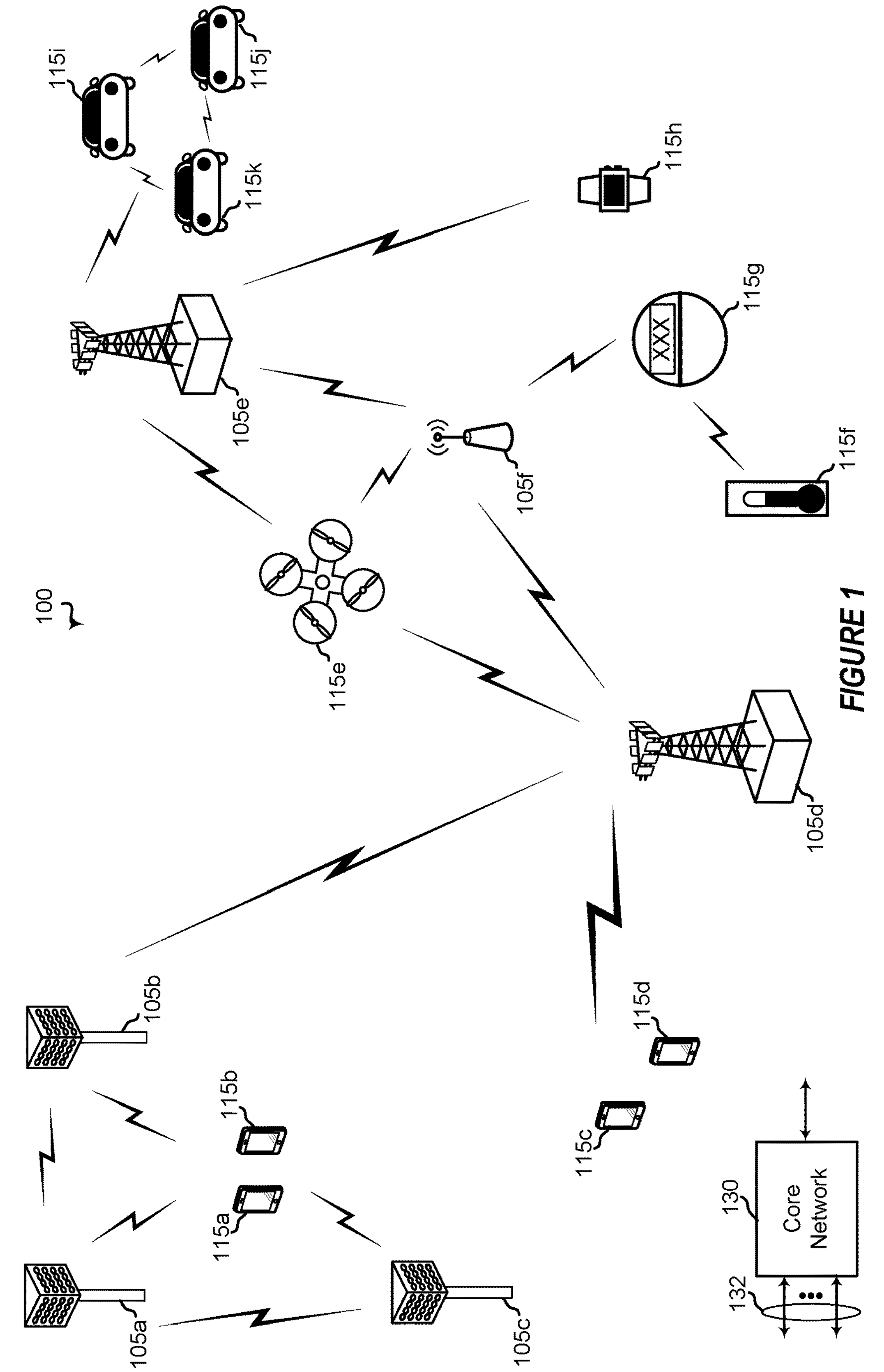
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Challenges exist in extending and leveraging $5^{th}$ Generation (5G) new radio (NR) techniques designed for use with 5 megahertz (MHz) radio frequency (RF) channels to narrower spectra while also remaining compliant with existing systems. As an illustrative example, a configuration of a synchronization signal block (SSB) in a 5G wireless standard is defined as having a bandwidth of 3.6 MHz. The SSB may include a physical broadcast channel (PBCH) and synchronization signals, such as a primary synchronization signal (PSS) and a secondary synchronization signal (SSS). Because these synchronization signals are not to be punctured, implementing the existing SSB configurations in narrow spectrum, such as 3 MHz RF communication channels, is challenging. Such challenges are compounded by the currently defined "sync raster points" (e.g., reference frequencies for candidate SSBs) being sparsely separated such that, in narrower spectrum, locating SSBs at most or all of the existing sync raster points would result in puncturing of the PSS and the SSS for at least some RF channels located at existing channel raster points.

The present disclosure provides systems, apparatus, methods, and computer-readable media that support SSB configuration for narrow spectrum. For example, the present disclosure describes a SSB configuration that is designed such that synchronization raster points are closer to each other in frequency than for synchronization raster points of legacy systems. As used herein, synchronization raster points refer to frequency positions at which the SSB can be centered, or otherwise referenced, when explicit signaling of the SSB is not present. To illustrate, when a user equipment (UE) is powered on and attempts to perform system acquisition with any nearby base stations, the UE may scan predefined synchronization raster points to determine whether the SSB is present at any of the synchronization raster points (i.e., frequencies). If no SSB is detected at any of the synchronization raster points, the UE may determine that no wireless network that it is capable of joining is present. Synchronization raster points, as well as other aspects of SSB configuration, designed for legacy systems to use wireless communication channels having 5 MHz or greater bandwidth may present challenges to supporting more narrow spectra. The present disclosure describes SSB configurations, including more closer defined synchronization raster points, that extend the system acquisition procedures of 5G NR systems to narrow dedicated spectra having bandwidths that are less than 5 MHz, such as spectra having bandwidths of 3 MHz or greater but less than 5 MHz. As particular examples, techniques of the present disclosure extend a SSB design used in spectra having bandwidth of 5 MHz or more to spectra having bandwidth of approximately 3 MHz in at least one 5G operating band, such as bands n8, n26, n28, and n100 in frequency range 1 ("FR1"), which is the designation of the frequency range from 410 MHz-7.125 MHz, by providing multiple SSB configurations with different synchronization raster points (e.g., reference frequencies).

To support 5G system acquisition techniques in narrower spectra while still supporting legacy 5G systems that operate in 5 MHz or larger spectra, user equipments (UEs) and base stations of the present disclosure may be configured to operate in accordance with both a narrow spectrum SSB configuration and a wider spectrum SSB configuration. To illustrate, a UE may be configured to, as part of a system acquisition process, scan for SSB communications at synchronization raster points corresponding to multiple SSB configurations (e.g., a narrow spectrum SSB configuration and a wider, or legacy, SSB configuration) and, based on which type of synchronization raster point corresponds to a detected SSB, the UE may determine a channel bandwidth to use in performing wireless communications with a base station that transmitted the SSB. For example, a UE may scan one or more of a plurality of bandwidths to identify a synchronization bandwidth via which a SSB is wirelessly communicated. The plurality of bandwidths may include a first subset of bandwidths associated with a wider spectrum SSB configuration (e.g., for a spectrum having a bandwidth that is greater than or equal to 5 MHz, also referred to as a legacy SSB configuration) and a second subset of bandwidths associated with a narrow spectrum SSB configuration (e.g., for a spectrum having a bandwidth that is less than 5 MHz).

Reference frequencies (e.g., synchronization raster points) of consecutive bandwidths of the first subset may be separated by a first frequency step value and reference frequencies (e.g., synchronization raster points) of consecutive bandwidths of the second subset may be separated by a second frequency step value that is less than the first frequency step value. As an illustrative example, reference frequencies of consecutive bandwidths from the first subset may be separated by 1200 kilohertz (kHz), and reference frequencies of consecutive bandwidths from the second subset may be separated by 100 kHz. Because the second frequency step value is less than the first frequency step value, synchronization raster points for the narrow spectrum SSB configuration are defined to be more closely packed in frequency than the more sparsely located synchronization raster points of the wider spectrum SSB configuration. These additional synchronization raster points may provide for more possible frequency locations of an SSB within a 3 MHz spectrum that do not require puncturing any of the included synchronization signals (e.g., a PSS or a SSS) to fit the SSB within the narrow spectrum while still using the same overall SSB design used by the wider spectrum SSB configuration (e.g., 5 MHz or greater spectrum).

The UE may identify a synchronization bandwidth as the bandwidth from the plurality of bandwidths via which the SSB is detected, and the UE may receive the SSB via the identified synchronization bandwidth. In some implementations, the UE may determine a channel bandwidth of a communication channel for communicating with a base station based on which subset of bandwidths includes the identified synchronization bandwidth. For example, if the UE detects the SSB at one of the first subset of bandwidths (e.g., using synchronization raster points of the wider spectrum SSB configuration), the UE may determine that the bandwidth of the communication channel is 5 MHz or greater. Alternatively, if the UE detects the SSB at one of the second subset of bandwidths (e.g., using synchronization raster points of the narrow spectrum SSB configuration), the UE may determine that the bandwidth of the communication channel is less than 5 MHz, such as approximately 3 MHz. In a similar manner, a base station may select a set of synchronization raster points (e.g., reference frequencies) from which to choose a synchronization bandwidth via which to transmit a SSB based on whether the base station will be communicating via a wider spectrum (e.g., 5 MHz or greater channel bandwidth) or a narrow spectrum (e.g., less than 5 MHz channel bandwidth).

In some implementations, the reference frequencies (e.g., the synchronization raster points) for one or both of the SSB configurations may be defined by a wireless communication standard, such as a 5G NR wireless communication standard promulgated by the 3rd Generation Partnership Project (3GPP). For example, a wireless communication standard may define one or more synchronization raster points (e.g., reference frequencies) to be used for each corresponding operating band of multiple operating bands. Such a wireless communication standard may reference these synchronization raster points by indices, such as a Global Synchronization Channel Number (GSCN), and one or more GSCNs may be assigned to each operating band. The operating bands may be mapped to the corresponding reference frequencies by tables, formulas, or the like, that are stored as mapping data at the UE and the base station.

In some implementations, the reference frequencies for the narrow spectrum SSB configuration may be identified using index numbers (e.g., GSCNs) that are greater than any index value that corresponds to a reference frequency for the wider spectrum SSB configuration. As an illustrative example, GSCNs 2-22255 may be used to represent reference frequencies of the wider spectrum SSB configuration (e.g., for bandwidths of the first subset) and GSCNs 32000 and above may be used to represent reference frequencies of the narrow spectrum SSB configuration (e.g., for bandwidths of the second subset). In some such examples, the reference frequencies of the narrow spectrum SSB configuration may be determined by summing a fixed frequency value and a frequency step multiplied by the difference between the GSCN and fixed value, such as 32000. As a particular illustrative example, the fixed frequency value may be 400 MHz, and the frequency step may be 100 kHz. In other examples, the fixed frequency value may be a different frequency, the fixed frequency value may include an offset value in order to change alignment between the SSB reference frequency and the assigned radio frequency (RF) channel, the frequency step size may be a different value, or a combination thereof. In such implementations, sequentially ordered GSCNs may increase by a step size of 1, such that two consecutive GSCNs may be consecutive integer values.

In some other implementations, the GSCNs for reference frequencies of the narrow spectrum SSB configuration may set equal to a global value used to define another aspect of system acquisition, such as a globally defined RF channel. For example, the GSCNs may be set to Absolute Radio Frequency Channel Numbers (NR-ARFCNs), which are index values of a global channel raster that has a granularity of 5 kHz. To illustrate, the values used for GSCNs for the narrow spectrum SSB configurations may be $N_{REF}$ values (e.g., points on the global channel raster) indexed by NR- ARFCNs, and each reference frequency may be equal to the corresponding GSCN (e.g., NR-ARFCN) multiplied by a particular frequency step, such as 5 kHz. In such implementations, sequentially ordered GSCNs may increase by a step size of 20, such that a difference in frequency between any two reference frequencies is a multiple of 100 kHz.

Particular implementations of the subject matter described in this disclosure may be implemented to realize one or more of the following potential advantages or benefits. In some aspects, the present disclosure provides techniques for supporting SSB configuration for narrow spectrum. For example, the techniques described herein enable the same overall SSB design to be extended to use for narrow spectra, such as less than 5 MHz, which may not be wide enough to support an entirety of the SSB. To support this extension, additional reference frequencies (e.g., synchronization raster points) may be defined that do not overlap with other existing reference frequencies and that are less sparsely located than the existing reference frequencies. By defining a second set of synchronization raster points that are more closely spaced in frequency as part of a narrow spectrum SSB configuration, a base station is provided with one or more candidate bandwidths at which to locate the SSB such that the synchronization signals within (e.g., the PSS and the SSS) are not punctured by the narrower bandwidth of the narrow spectrum. This enables UEs that communicate via the reduced spectrum to perform system acquisition using the techniques already designed for 5G networks in wider spectra (e.g., communication bandwidths that are 5 MHz or greater). As such, systems can support narrow spectrum SSB configurations without complex changes or without no longer supporting legacy SSB configurations. Additionally, some implementations described herein leverage other existing configurations, such as a global channel raster, to enable the techniques described herein by using existing configurations instead of defining entirely new ones, thereby reducing the memory footprint and complexity of implementing the narrow SSB configuration.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” (mmWave) band in documents and articles, despite being different from the extremely high frequency (EHF) band (30 GHz-300 GHz) which is identified by the International Telecommunications Union (ITU) as a “mmWave” band.

With the above aspects in mind, unless specifically stated otherwise, it should be understood that the term “sub-6 GHz” or the like if used herein may broadly represent frequencies that may be less than 6 GHz, may be within FR1, or may include mid-band frequencies. Further, unless specifically stated otherwise, it should be understood that the term “mmWave” or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term “cell” may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
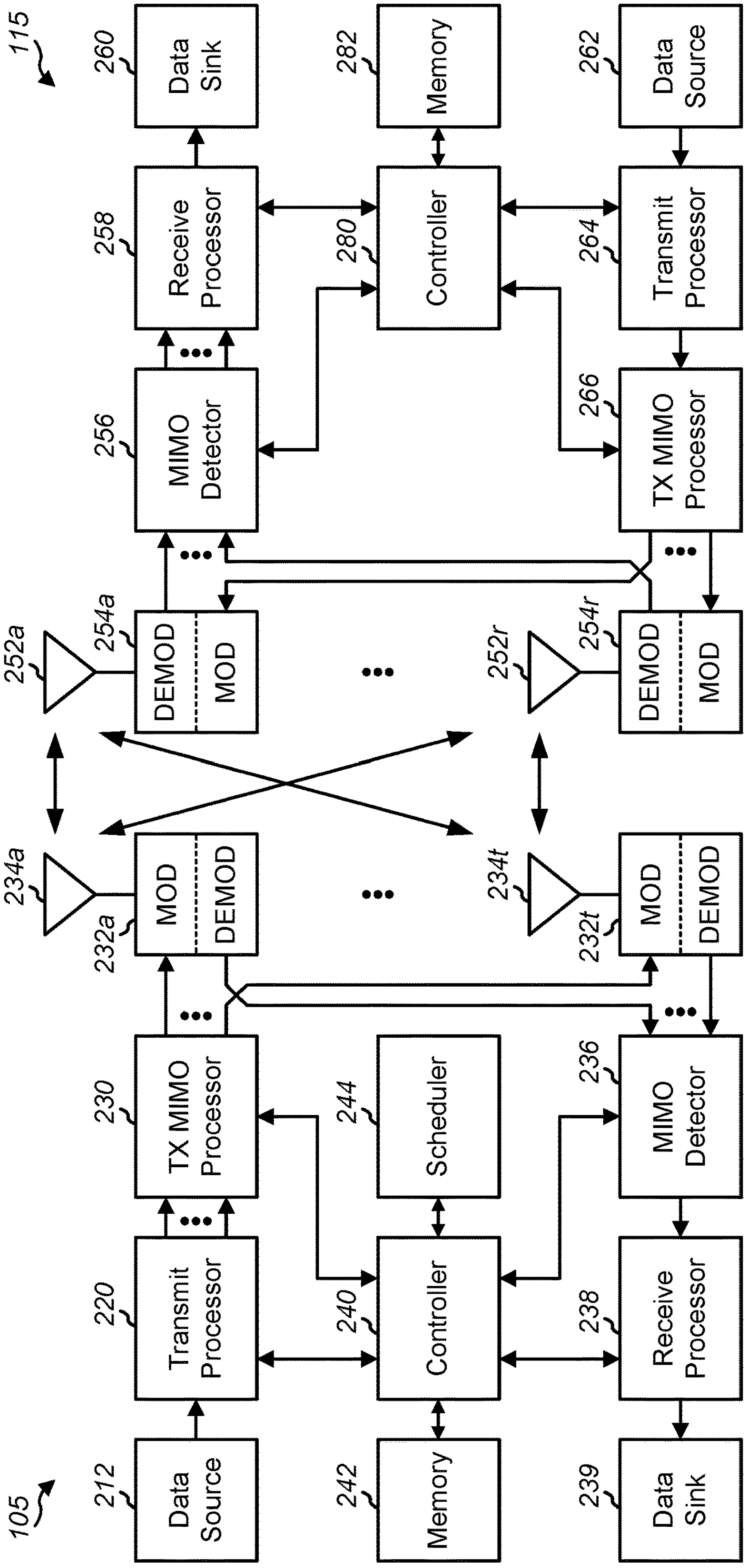
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 9 and 11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
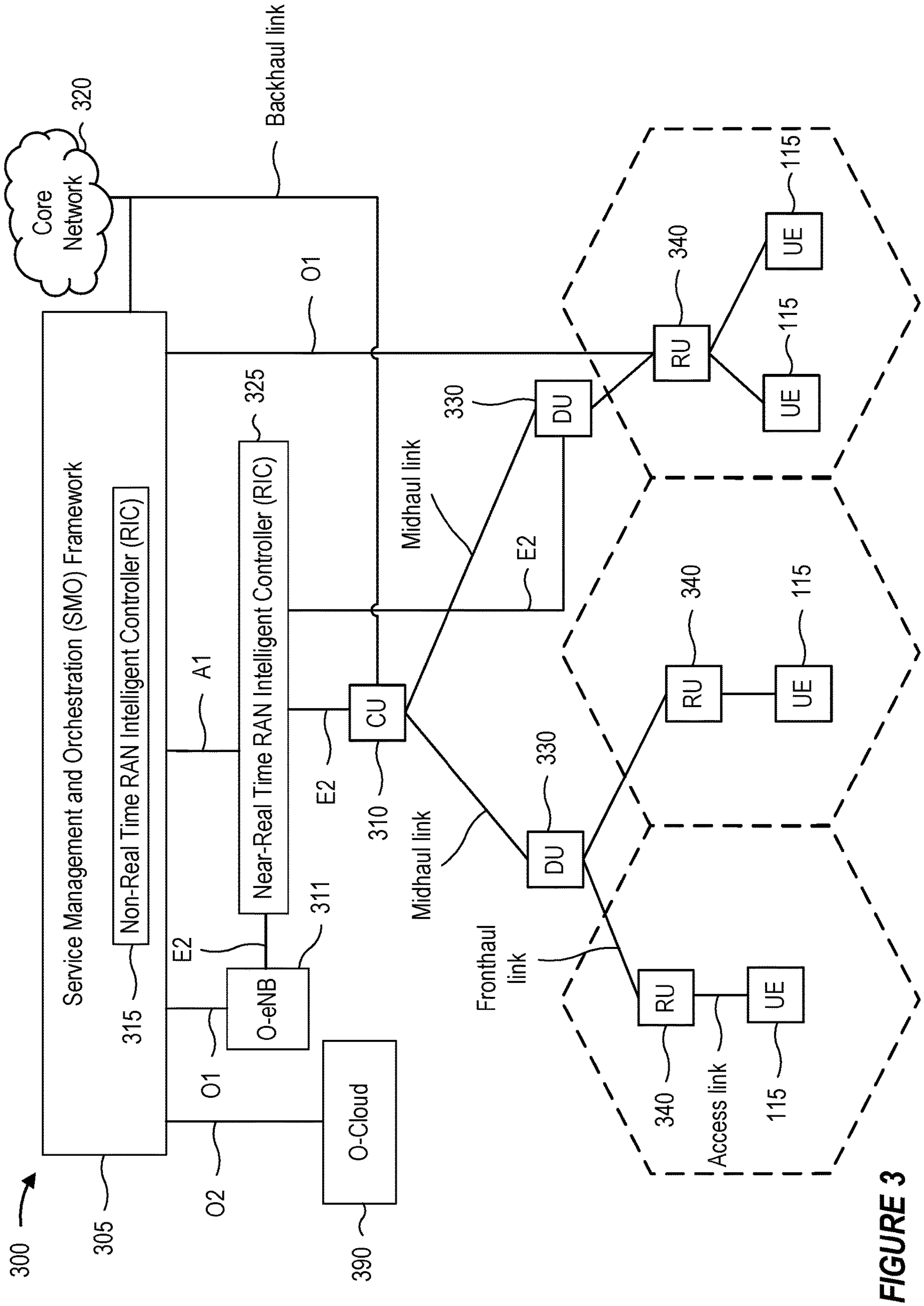
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
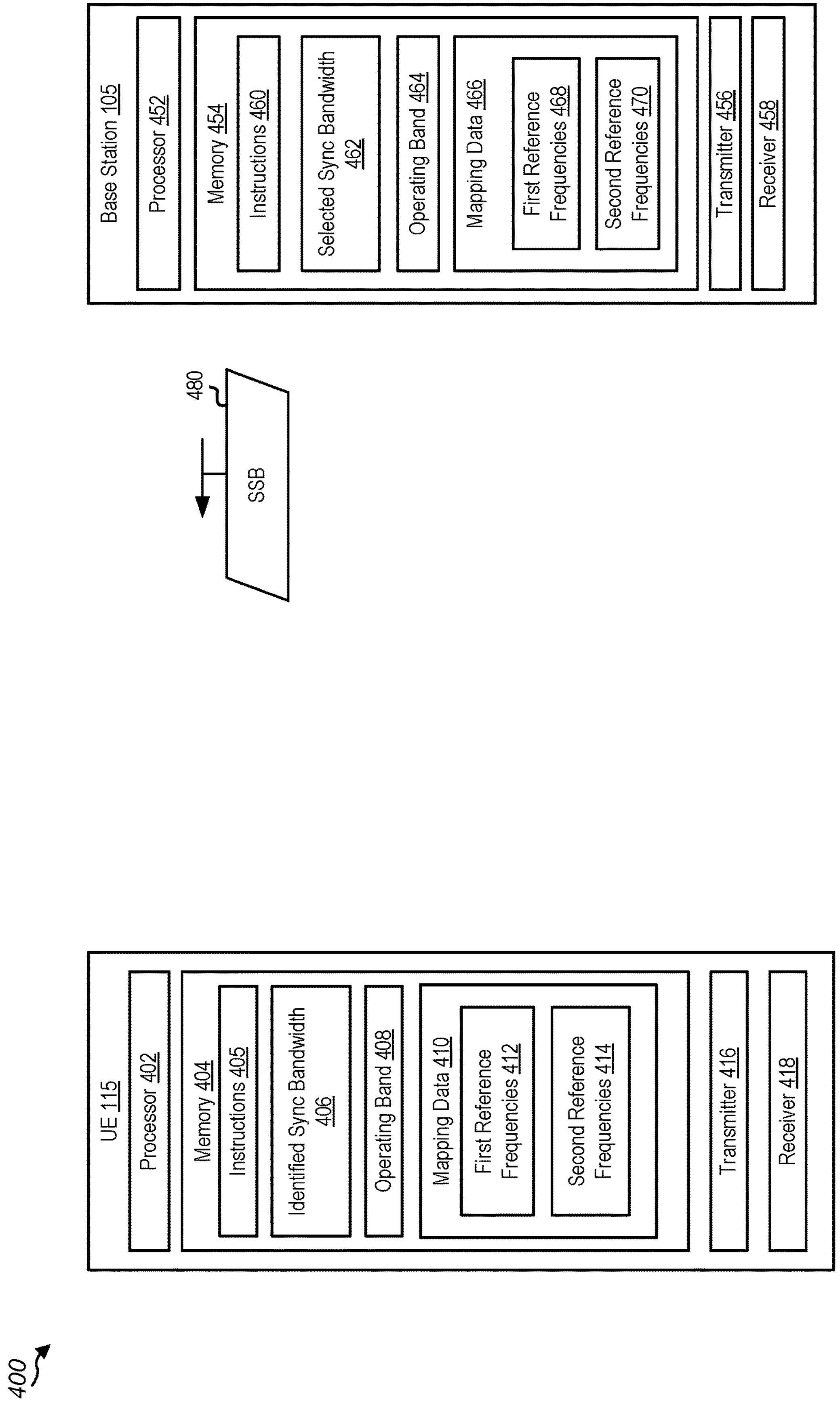
FIG. 4 is a block diagram illustrating an example wireless communication system that supports synchronization signal block (SSB) configuration for narrow spectrum according to one or more aspects.

FIG. 4 is a block diagram of an example wireless communication system 400 that supports SSB configuration for narrow spectrum according to one or more aspects. In some examples, wireless communications system 400 may implement aspects of wireless network 100. Wireless communications system 400 includes UE 115 and base station 105. Although one UE 115 and one base station 105 are illustrated, in some other implementations, in some other implementations wireless communication system 400 may include a different number of UEs, a different number of base stations, or a combination thereof.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). In some implementations, UE 115 may include an interface (e.g., a communication interface) that includes transmitter 416, receiver 418, or a combination thereof. Processor 402 may be configured to execute instructions 405 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 405, identified synchronization bandwidth 406, operating band 408, and mapping data 410. Identified synchronization bandwidth 406 includes one or more parameters (e.g., a reference frequency or center frequency, a frequency range, etc.) that represent a bandwidth identified by UE 115 as including a SSB. Stated another way, UE 115 may be configured to scan multiple bandwidths (e.g., frequency ranges) to detect whether a SSB is present within one of the multiple bandwidths, and identified synchronization bandwidth 406 represents the bandwidth via which a SSB is detected. Operating band 408 represents an operating band (e.g., a channel bandwidth of a communication channel) for communications performed by UE 115 with other devices, such as base station 105. Operating band 408 may represent a single operating band or multiple operating bands via which UE 115 can communicate with other wireless devices within a network (e.g., wireless communication system 400). Operating band 408 may be one or more of multiple operating bands specified by one or more organizations, allocated to one or more spectrum providers, or the like, and may be preconfigured at or selectable by UE 115.

Mapping data 410 may include preconfigured mapping data that indicates a mapping between a group of operating bands and reference frequencies (e.g., synchronization raster points) of candidate synchronization bandwidths that correspond to the group of operating bands. As an illustrative example, mapping data 410 may indicate that a particular operating band corresponds to three particular candidate synchronization bandwidths, each having a corresponding reference frequency (e.g., a center frequency or other reference frequency), in which a SSB transmitted by a base station may be located in the frequency domain. In some implementations, the mapping represented by mapping data 410 is defined by a wireless communication standard, such as a 3GPP wireless communication standard.

To enable UE 115 to communicate via wireless spectra (e.g., wireless communication channels) having bandwidths greater than or equal to 5 MHz (referred to herein as "wider spectrum") and less than 5 MHz (referred to herein as "narrow spectrum"), mapping data 410 may include first mapping data that corresponds to a wider spectrum SSB configuration (e.g., SSB configuration for wireless channels having bandwidth of 5 MHz or greater, also referred to herein as a legacy SSB configuration) and second mapping data that corresponds to a narrow spectrum SSB configuration (e.g., a SSB configuration for wireless channels having bandwidth of less than 5 MHz). In some implementations, the narrow spectrum described herein include or correspond to a wireless channel having bandwidth of 3 MHz. In other implementations, the bandwidth of the narrow spectrum may be between 3 and 5 MHz or less than 3 MHz. The first mapping data (e.g., a first portion of mapping data 410) that corresponds to the wider spectrum SSB configuration may map a group of operating bands to reference frequencies including first reference frequencies 412. The second mapping data (e.g., a second portion of mapping data 410) that corresponds to the narrow spectrum SSB configuration may map the group of operating bands, or a portion thereof, to reference frequencies including second reference frequencies 414. Consecutive reference frequencies of first reference frequencies 412 may be separated by a different frequency step value than consecutive reference frequencies of second reference frequencies 414 as part of different SSB configurations that enable use of the same overall SSB design to be used for communication via the wider spectrum or the narrow spectrum without violating any industry-agreed operational rules, such as one or more rules specified by a wireless communication standard.

Figure 5:
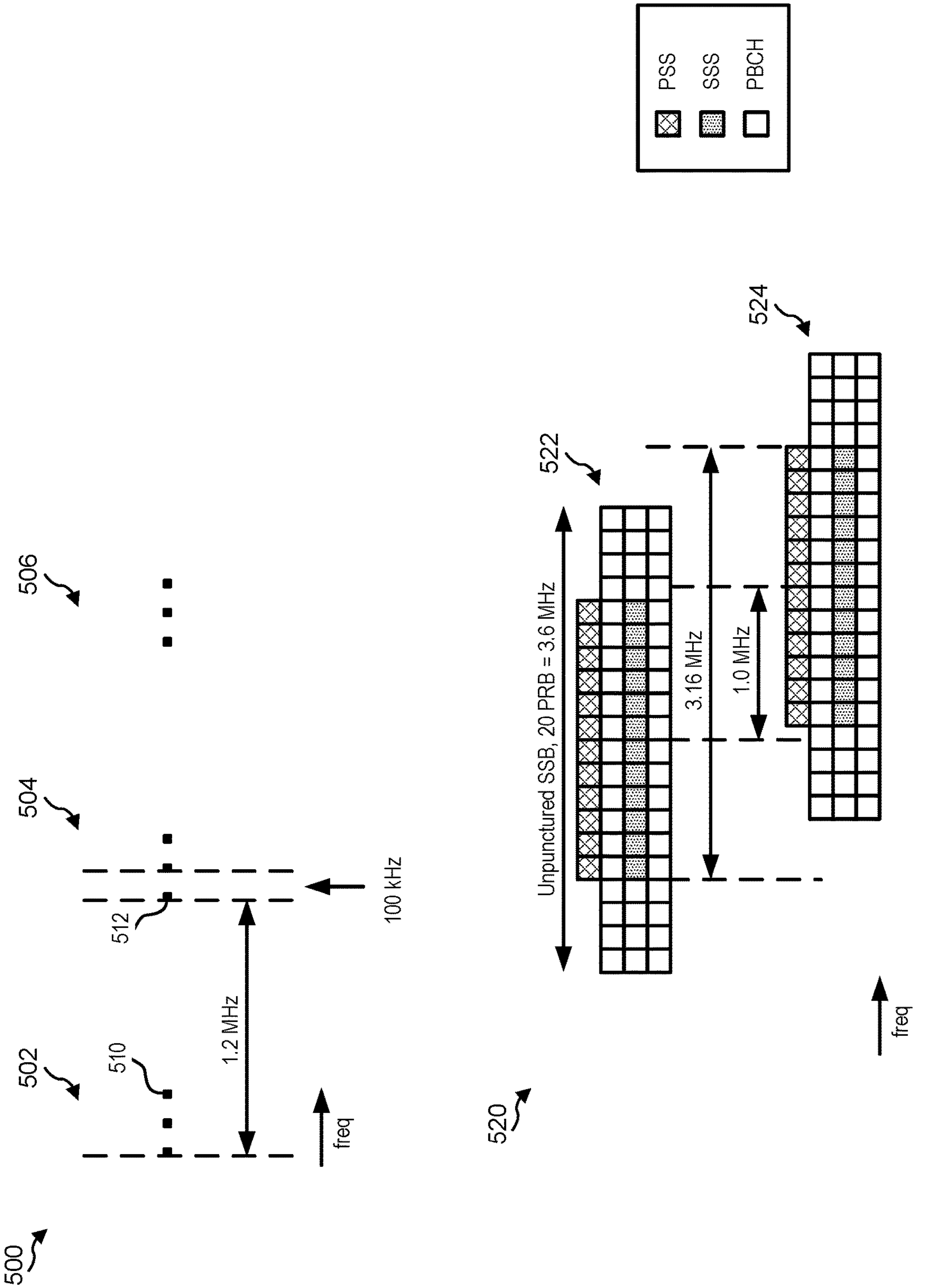
FIG. 5 is a diagram of an example of channel and SSB configuration and reference frequency spacing according to one or more aspects.

To illustrate SSB design and configuration, FIG. 5 depicts an example of channel and SSB configuration and reference frequency spacing corresponding to a wider spectrum SSB configuration. Synchronization raster configuration 500 represents a configuration of candidate reference frequencies, also referred to as synchronization raster points, across a wireless spectrum. According to the wider spectrum SSB configuration, candidate reference points are grouped together in clusters of three reference points separated by a frequency step size of 100 kHz, with each cluster being separated by a frequency step size of 1.2 MHz. In the example of FIG. 5, synchronization raster configuration 500 includes a first cluster 502, a second cluster 504, and a third cluster 506. Although three clusters of three candidate reference frequencies are shown, in other implementations, a SSB configuration may include more than three or fewer than three clusters, more than three or fewer than three candidate reference frequencies may be included in each cluster, or a combination thereof. A first candidate reference frequency included in second cluster 504 is located at a frequency that is 1.2 MHz greater than a first candidate reference frequency included in first cluster 502, and a first candidate reference frequency included in third cluster 506 is located at a frequency that is 1.2 MHz greater than the first candidate reference frequency included in second cluster 504 and 2.4 MHz greater than the first candidate reference frequency included in first cluster 502. For example, the first candidate reference frequency of first cluster 502 may be located at a particular frequency j, a second candidate reference frequency of first cluster 502 may be located at j+100 kHz, a third candidate reference frequency of first cluster 502 may be located at j+200 kHz, the first candidate reference frequency of second cluster 504 may be located at j+1.2 MHz, a second candidate reference frequency of second cluster 504 may be located at j+1.3 MHz, a third candidate reference frequency of second cluster 504 may be located at j+1.4 MHz, the first candidate reference frequency of third cluster 506 may be located at j+2.4 MHz, a second candidate reference frequency of third cluster 506 may be located at j+2.5 MHz, and a third candidate reference frequency of third cluster 506 may be located at j+2.6 MHz.

FIG. 5 also includes SSB examples 520 that correspond to illustrative candidate reference frequencies 510 and 512 of synchronization raster configuration 500. Each SSB, if unpunctured, covers twenty resource blocks (RBs), which is equal to a bandwidth of 3.6 MHz in this example. A first SSB 522 is located at candidate reference frequency 510 (e.g., the second candidate reference frequency of first cluster 502) and a second SSB 524 is located at candidate reference frequency 512 (e.g., the first candidate reference frequency of second cluster 504). To conform to one or more existing wireless communication standards, channel raster points (e.g., candidate reference frequencies for a RF channel) are to have a frequency step size of 100 kHz and a primary synchronization signal (PSS) and a secondary synchronization signal (SSS) included in the SSB are not to be punctured and are designed to cover twelve RBs (e.g., 2.16 MHz). As can be appreciated from FIG. 5, the closest candidate reference frequencies (e.g., synchronization raster points) in two distinct clusters is 1.0 MHz (e.g., from j+200 kHz to j+1.2 MHz). The distance between outer edges of the PSS and SSS in these two SSB positions is therefore 3.16 MHz. However, this distance (e.g., 3.16 MHz) is greater than a 3 MHz channel+100 kHz channel raster step size, and thus does not match with two existing channel raster points. As such, using the synchronization raster points (e.g., candidate reference frequencies for the wider spectrum SSB configuration) defined for the wider spectrum SSB configuration with the narrow spectrum SSB configuration results in at least some of the PSS and SSS falling outside of a 3 MHz channel at one or more channel raster points.

Returning to FIG. 4, in order to prevent the PSS and SSS from falling outside of a narrow spectrum, while still honoring the rule not to puncture the PSS and the SSS and to conform to the 100 kHz channel raster frequency step size, different synchronization raster points (e.g., candidate frequency values) may be defined for the narrow spectrum SSB configuration as compared to the wider spectrum SSB configuration. For example, a second frequency step value that separates consecutive reference frequencies of second reference frequencies 414 may be less than a first frequency step value that separates consecutive reference frequencies of first reference frequencies 412. In some implementations, the first frequency step value is 1200 kHz and the second frequency step value is 100 kHz, as further described herein. By decreasing the second frequency step value as compared to the first frequency step value, synchronization raster points may be less sparsely located in the frequency domain, such that a distance between outer edges of the PSS and SSS in any two SSB positions is less than or equal to 3 MHz, thereby enabling retaining an entirety of the PSS and SSS from any two consecutive synchronization raster points within a single 3 MHz communication channel. This may enable legacy or wider spectrum configured devices to use the existing defined channel raster points and synchronization raster points in addition to the SSB design, and devices capable of operating in the narrow spectrum may use a new set of synchronization raster points only when operating in an operating band having a bandwidth that is less than 5 MHz. Because the less sparse synchronization raster point configuration may be associated with greater power consumption due to a larger number of frequencies being scanned to detect the SSB, providing a different SSB configuration for devices that communicate via the narrow spectrum instead of having all devices use this SSB configuration may mitigate the increased power consumption by limiting the amount of devices that scan more frequencies for the SSB.

FIG. 6 shows an example of the SSB configuration for wider spectrum according to one or more aspects. In some implementations, a first portion of mapping data 410 may include or correspond to table 600 and table 610 of FIG. 6. Table 600 provides reference frequencies ($SS_{REF}$) and corresponding index values for the wider spectrum SSB configuration. The reference frequencies (e.g., synchronization raster points) indicate the frequency positions of the synchronization block that can be used by a UE for system acquisition when explicit signaling of the synchronization block position is not present. The collection of reference frequencies define a global synchronization raster for all frequencies. In the example shown in FIG. 6, the reference frequencies are grouped into one of two frequency ranges, FR1 (0-3000 MHz) and FR2 (3000-24250 MHz), with different corresponding formulas. In other implementations, the reference frequencies may be grouped into more than two frequency ranges or grouped based on different characteristics. In FR1, reference frequencies (e.g., synchronization raster points) are equal to N*1200 kHz+M*50 kHz, for values of N ranging from 1 to 2499 and for fixed values of M of 1, 3, or 5. A corresponding index, also referred to as a global synchronization channel number (GSCN), is equal to 3N+(M−3)/2. As a non-limiting example, for N=10 and M=3, the corresponding reference frequency is 12.15 MHz and the corresponding index is 30. In this manner, reference frequencies may be defined for a frequency range of 0 to 3000 MHz having index values in a range of 2 to 7498. In FR2, reference frequencies (e.g., synchronization raster points) are equal to 3000 MHz+N*1.44 MHz, for values of N of 0 to 14756. A corresponding index (e.g., GSCN) is equal to 7499+N. As a non-limiting example, for N=10, the corresponding reference frequency is 3014.4 MHz and the corresponding index is 7509. In this manner, reference frequencies may be defined for a frequency range of 3000 to 24250 MHz having index values in a range of 7499 to 22255. As can be appreciated from the example in FIG. 6, each index value of a reference frequency is unique with respect to other reference frequencies, both within the same frequency ranges and across different frequency ranges. Additionally, the frequency step value between consecutive reference frequencies for FR1 is approximately 1200 kHz. For example, the frequency step value may be 1200 kHz or 1200 kHz plus or minus 100 kHz or 200 kHz, depending on the value of M at each of the two reference frequencies.

Table 610 provides assignments of one or more reference frequencies, by index number, to particular operating bands. Operating bands n8, n26, n28, and n100 (e.g., operating bands in FR1) are shown for convenience, but it is noted that any or all operating bands may be assigned reference frequencies (e.g., synchronization raster points). The example shown in FIG. 6 corresponds to the wider spectrum SSB configuration having a subcarrier spacing (SCS) of 15 kHz and a synchronization signal (SS) block pattern referred to as "Case A", but the techniques described herein are not so limited. In other examples, reference frequencies may be defined for operating bands in different frequency ranges, such as FR2, for different SS block SCS, such as 30 kHz, for different SS block patterns, or a combination thereof. As shown in FIG. 6, each operating band is assigned one or more index values (e.g., GSCNs), typically multiple index values in sequential order and separated by an index value step size of 1. The particular assignment is illustrative, and in other examples, these operating bands may be assigned different index values from different ranges and/or having different step sizes. Each of the assigned index values indicates a corresponding reference frequency assigned to the operating band. For example, index value 2319 may indicate a reference frequency of 927.75 MHz if M is 3.

FIG. 7 shows a first example of the SSB configuration for narrow spectrum according to one or more aspects. In some implementations, a second portion of mapping data 410 may include or correspond to table 700 and table 710 of FIG. 7. Table 700 provides reference frequencies ($SS_{REF}$) and corresponding index values for a first implementation of the narrow spectrum SSB configuration. In the example shown in FIG. 7, the reference frequencies are grouped into one of two frequency ranges, FR1 (0-3000 MHz) and FR2 (3000-24250 MHz), with different corresponding formulas. In other implementations, the reference frequencies may be grouped into more than two frequency ranges or grouped based on different characteristics. In FR1, reference frequencies (e.g., synchronization raster points) are equal to 400 MHz+L*100 kHz, for values of L beginning at 0 and having a step size of 1. A corresponding index value (e.g., GSCN) is equal to 32000+L. As a non-limiting example, for L=20, the corresponding reference frequency is 402 MHz and the corresponding index is 32020. In this manner, reference frequencies may be defined for a frequency range of 0 to 3000 MHz having index values in a range of 32000 to an upper bound. In FR2, the reference frequencies (e.g., synchronization raster points) and index values are the same as in table 600 of FIG. 6. As can be appreciated from the example in FIG. 7, each index value of a reference frequency is unique with respect to other reference frequencies, both within the same frequency ranges and across different frequency ranges. Additionally, the frequency step value between consecutive reference frequencies for FR1 is 100 kHz because a fixed value (e.g., 400 MHz) is added to a multiple of 100 kHz to generate the reference frequency. Although the fixed value is 400 MHz in the example shown in FIG. 7, in other examples, the fixed value could be a different frequency.

In the example shown in FIG. 7, the fixed value does not include an offset, such that a reference frequency of a SSB is aligned with a reference frequency of a RF channel (e.g., synchronization raster points and channel raster points are aligned). In some other implementations, an offset may be added to the fixed value such that the reference frequency of the SSB is not aligned with the reference frequency of the RF channel (e.g., as indicated by a nearest channel raster point). The offset may be equal to any number of RBs that do not offset the SSB so far that the PSS and/or SSS are punctured by the narrow spectrum. This is because, to fit a 3.6 MHz SSB to a 3 MHz RF channel bandwidth, some PBCH RBs need to be punctured (i.e., not transmitted). In this situation, either four or five RBs will be punctured, leaving either 15 or 16 RBs left to the 3 MHz RF channel bandwidth. For example, with reference to FIG. 5, some combination of four RBs from the four left-most RBs and the four right-most RBs of the PBCH will be punctured, and therefore the PSS and SSS should be located within the RBs that are not punctured. Depending on the puncturing scheme selected, the center frequency of the PSS and the SSS (e.g., the synchronization raster point) may be shifted one or two RBs to the right or to the left (e.g., with reference to the channel raster point) without resulting in either end of the PSS and the SSS being punctured. Thus, for a 3 MHz RF channel bandwidth, the offset may be 0 kHz, 180 kHz, 360 kHz, −180 kHz, or −360 kHz, and accordingly the fixed value may be 400 MHz, 400.18 MHz, 400.36 MHz, 399.82 MHz, or 399.64 MHz, depending on the puncturing scheme. For other RF channel bandwidths and RB sizes, the offset may have different values.

Table 710 provides assignments of one or more reference frequencies, by index number, to particular operating bands. Operating bands n8, n26, n28, and n100 (e.g., operating bands in FR1) are shown for convenience, but it is noted that any or all operating bands may be assigned reference frequencies (e.g., synchronization raster points). The example shown in FIG. 7 corresponds to the narrow spectrum SSB configuration having a SS block SCS of 15 kHz and a SS block pattern of Case A, but the techniques described herein are not so limited. In other examples, reference frequencies may be defined for operating bands in different frequency ranges, such as FR2, for different SS block SCS, such as 30 kHz, for different SS block patterns, or a combination thereof. As shown in FIG. 7, each operating band is assigned one or more index values (e.g., GSCNs), typically multiple index values in sequential order and separated by an index value step size of 1. The particular assignment is illustrative, and in other examples, these operating bands may be assigned different index values from different ranges and/or having different step sizes. Each of the assigned index values indicates a corresponding reference frequency assigned to the operating band. For example, index value 36345 may indicate a reference frequency of 834.5 MHz.

As can be appreciated, for the example of the first implementation of the narrow spectrum SSB configuration shown in FIG. 7 and the wider SSB configuration shown in FIG. 6, consecutive reference frequencies of the wider spectrum SSB configuration are separated by a first frequency step size that is greater than a second frequency step size that separates consecutive reference frequencies of the narrow spectrum SSB configuration. For example, the first frequency step size may be 1.2 MHz and the second frequency step size may be 100 kHz. Additionally, first index values (e.g., GSCNs) corresponding to reference frequencies of FR1 the wider spectrum SSB configuration are less than second index values corresponding to reference frequencies of FR1 in the narrow spectrum SSB configuration, and consecutive index values of both the first index values and the second index values are separated by a same step size. For example, the step size of the GSCNs shown in table 610 and table 710 are both 1.

FIG. 8 shows a second example of the SSB configuration for narrow spectrum according to one or more aspects. In some implementations, a second portion of mapping data 410 may include or correspond to table 800 and table 810 of FIG. 8. Table 800 provides reference frequencies ($SS_{REF}$) and corresponding index values for a second implementation of the narrow spectrum SSB configuration. In the example shown in FIG. 8, the reference frequencies are grouped into one of two frequency ranges, FR1 (0-3000 MHz) and FR2 (3000-24250 MHz), with different corresponding formulas. In other implementations, the reference frequencies may be grouped into more than two frequency ranges or grouped based on different characteristics. The second implementation of the narrow spectrum SSB configuration leverages existing globally defined value(s) (e.g., in a wireless communication standard) to simplify implementation of a second, distinct mapping of operating bands to synchronization reference frequencies (e.g., synchronization raster points). To illustrate, the index values of reference frequencies of the narrow spectrum SSB configuration may include a subset of channel index values corresponding to globally defined RF channels. In some implementations, those values include $N_{REF}$ values. As used herein, $N_{REF}$ is a reference frequency indexed by a New Radio-Absolute Radio Frequency Channel Number (NR-ARFCN). As defined in a wireless communication standard, each NR-ARFCN corresponds to a reference frequency on a global frequency channel raster that is used for signaling the position of RF channels, SS blocks, and other elements. The global frequency channel raster is defined for all frequencies from 0 to 100 GHz, and in FR1 (e.g., 0-3000 MHz), has a granularity (e.g., frequency step size) of 5 kHz. Additionally, in FR1, $N_{REF}$ is specified to range from 0 to 599999.

In the example of FIG. 8, for FR1, reference frequencies are equal to $N_{REF}$*5 kHz. A corresponding index value (e.g., GSCN) is equal to $N_{REF}$. As a non-limiting example, for $N_{REF}$=200000, the corresponding reference frequency is 1000 MHz and the corresponding index is 200000. In this manner, reference frequencies may be defined for a frequency range of 0 to 3000 MHz having index values in a range of 0 to 599999. In FR2, the reference frequencies (e.g., synchronization raster points) and index values are the same as in table 600 of FIG. 6, except that the reference values range from 600000 to 614756 instead of 7499 to 22255. As can be appreciated from the example in FIG. 8, each index value of a reference frequency is unique with respect to other reference frequencies, both within the same frequency ranges and across different frequency ranges. Additionally, the frequency step value between consecutive reference frequencies for FR1 is 100 kHz because the frequency step size between consecutive values of ARFCN is 5 kHz (e.g., the global frequency channel raster has a granularity of 5 kHz).

Table 810 provides assignments of one or more reference frequencies, by index number, to particular operating bands. Operating bands n8, n26, n28, and n100 (e.g., operating bands in FR1) are shown for convenience, but it is noted that any or all operating bands may be assigned reference frequencies (e.g., synchronization raster points). The example shown in FIG. 8 corresponds to the narrow spectrum SSB configuration having a SS block SCS of 15 kHz and a SS block pattern of Case A, but the techniques described herein are not so limited. In other examples, reference frequencies may be defined for operating bands in different frequency ranges, such as FR2, for different SS block SCS, such as 30 kHz, for different SS block patterns, or a combination thereof. As shown in FIG. 8, each operating band is assigned one or more index values (e.g., GSCNs), typically multiple index values in sequential order and separated by an index value step size of 20. The particular assignment is illustrative, and in other examples, these operating bands may be assigned different index values from different ranges and/or having different step sizes. Each of the assigned index values indicates a corresponding reference frequency assigned to the operating band. For example, index value 185000 may indicate a reference frequency of 927.5 MHz.

As can be appreciated, for the example of the second implementation of the narrow spectrum SSB configuration shown in FIG. 8 and the wider SSB configuration shown in FIG. 6, consecutive reference frequencies of the wider spectrum SSB configuration are separated by a first frequency step size that is greater than a second frequency step size that separates consecutive reference frequencies of the narrow spectrum SSB configuration. For example, the first frequency step size may be 1.2 MHz and the second frequency step size may be 100 kHz. Additionally, consecutive index values (e.g., GSCNs) corresponding to reference frequencies of FR1 the wider spectrum SSB configuration are separated by a first step size that is different than a second step size that separates consecutive index values corresponding to reference frequencies of FR1 in the narrow spectrum SSB configuration. For example, the first step size of the GSCNs shown in table 610 is one and the second step size of the GSCNs shown in table 810 is twenty.

Returning to FIG. 4, transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

In some implementations, UE 115 may include one or more antenna arrays. The one or more antenna arrays may be coupled to transmitter 416, receiver 418, or a communication interface. The antenna arrays may include multiple antenna elements configured to perform wireless communications with other devices, such as with the base station 105. In some implementations, the antenna arrays may be configured to perform wireless communications using different beams, also referred to as antenna beams. The beams may include TX beams and RX beams. To illustrate, an antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna arrays may be configured to communicate via more than two beams. Alternatively, one or more sets of antenna elements of the antenna arrays may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the one or more antenna arrays may include or correspond to multiple antenna panels, and each antenna panel may be configured to communicate using a different respective beam.

UE 115 may include one or more components as described herein with reference to UE 115. In some implementations, UE 115 is a 5G-capable UE, a 6G-capable UE, or a combination thereof.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). In some implementations, base station 105 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store instructions 460, selected synchronization bandwidth 462, operating band 464, and mapping data 466. Selected synchronization bandwidth 462 includes one or more parameters (e.g., a reference frequency or center frequency, a frequency range, etc.) that represent a bandwidth selected by base station 105 via which to transmit a SSB. For example, base station 105 may select selected synchronization bandwidth 462 based on operating band 464 using mapping data 466, as further described herein, and optionally based on additional parameters. Operating band 464 represents an operating band (e.g., a channel bandwidth of a communication channel) for communications performed by base station 105 with other devices, such as UE 115. Operating band 464 may represent a single operating band or multiple operating bands via which base station 105 can communicate with other wireless devices within a network (e.g., wireless communication system 400). Operating band 464 may be one or more of multiple operating bands specified by one or more organizations, allocated to one or more spectrum providers, or the like, and may be preconfigured at or selectable by base station 105.

Mapping data 466 may include preconfigured mapping data that indicates a mapping between a group of operating bands and reference frequencies (e.g., synchronization raster points) of candidate synchronization bandwidths that correspond to the group of operating bands. For example, mapping data 466 may be the same as mapping data 410. In some implementations, the mapping represented by mapping data 466 is defined by a wireless communication standard, such as a 3GPP wireless communication standard. Additionally, or alternatively, mapping data 466 may include first mapping data that corresponds to a wider spectrum SSB configuration (e.g., SSB configuration for wireless channels having bandwidth of 5 MHz or greater) and second mapping data that corresponds to a narrow spectrum SSB configuration (e.g., a SSB configuration for wireless channels having bandwidth of less than 5 MHz).

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2 or one or more components of disaggregated base station 300 described with reference to FIG. 3.

In some implementations, base station 105 may include one or more antenna arrays. The one or more antenna arrays may be coupled to transmitter 456, receiver 458, or a communication interface. The antenna arrays may include multiple antenna elements configured to perform wireless communications with other devices, such as with the UE 115. In some implementations, the antenna arrays may be configured to perform wireless communications using different beams, also referred to as antenna beams. The beams may include TX beams and RX beams. To illustrate, an antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna arrays may be configured to communicate via more than two beams. Alternatively, one or more sets of antenna elements of the antenna arrays may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the one or more antenna arrays may include or correspond to multiple antenna panels, and each antenna panel may be configured to communicate using a different respective beam.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP. In some other implementations, wireless communications system 400 implements a 6G network.

During operation of wireless communications system 400, UE 115 may attempt to access a wireless network hosted by base station 105. For example, UE 115 may be powered on in a coverage area of base station 105, UE 115 may move into the coverage area, UE 115 may attempt to change to a new wireless network, or the like. To perform system acquisition with base station 105, UE 115 may scan for a SSB in order to receive synchronization signals and other information used to receive additional communications from base station 105. If SSB information is not broadcast by base station 105, UE 115 may determine to scan one or more bandwidths (e.g., frequency ranges) to detect a SSB communicated by base station 105. To illustrate, UE 115 may scan one or more of a plurality of bandwidths to identify a synchronization bandwidth (e.g., identified synchronization bandwidth 406) via which SSB 480 is wirelessly communicated by base station 105. The plurality of bandwidths scanned by UE 115 may include two subsets: a first subset of bandwidths corresponding to the wider spectrum SSB configuration and a second subset of bandwidths corresponding to the narrow spectrum SSB configuration.

To determine which bandwidths to scan for SSB 480, UE 115 may access mapping data 410 based on operating band 408 to select the plurality of bandwidths to be scanned from a group of bandwidths representing candidate synchronization bandwidths. For example, UE 115 may access mapping data 410 to determine first reference frequencies 412 that are mapped to operating band 408 in a first portion of mapping data 410 that corresponds to the wider spectrum SSB configuration. Similarly, UE 115 may access mapping data 410 to determine second reference frequencies 414 that are mapped to operating band 408 in a second portion of mapping data 410 that corresponds to the narrow spectrum SSB configuration. As an illustrative example, if operating band 408 is band n26, UE 115 may select reference frequencies corresponding to GSCNs 2153-2230 for first reference frequencies 412 based on table 610 of FIG. 6, and UE 115 may select reference frequencies corresponding to GSCNs 34165-34242 for second reference frequencies 414 based on table 710 of FIG. 7. UE 115 may scan bandwidths located at first reference frequencies 412 and second reference frequencies 414 until SSB 480 is detected on one of the bandwidths, and the bandwidth via which SSB 480 is detected is recognized as identified synchronization bandwidth 406. First reference frequencies 412 and second reference frequencies 414 may be scanned in any order, serially or in parallel, to search for SSB 480. In some implementations, owners or operators of spectrum in bands n8, n26, n28, and n100 may provide wireless communication services using narrow spectra (e.g., less than 5 MHz channel bandwidths), and thus UE 115 may only scan bandwidths corresponding to both SSB configurations in those operating bands. Alternatively, the narrow spectrum communications may be used on other or all operating bands, and UE 115 may scan bandwidths corresponding to both SSB configurations in any or all operating bands.

After detection of SSB 480 via identified synchronization bandwidth 406, UE 115 may monitor identified synchronization bandwidth 406 and receive SSB 480. Identified synchronization bandwidth 406 may be located within a RF channel (e.g., within channel resources allocated to a RF channel) having a reference frequency located at one of a plurality of channel reference frequencies (e.g., channel raster points). In some implementations, consecutive channel reference frequencies of the plurality of channel reference frequencies are separated by the same frequency step value that separates second reference frequencies 414 (e.g., 100 kHz in the examples of FIGS. 7 and 8). Monitoring identified synchronization bandwidth 406 for SSB 480 may include monitoring the RF channel after identifying identified synchronization bandwidth 406, and UE 115 may receive SSB via identified synchronization bandwidth 406 responsive to monitoring the RF channel. Stated another way, frequency resources corresponding to identified synchronization bandwidth 406 may be a subset of frequency resources corresponding to the RF channel. Identified synchronization bandwidth 406 may be aligned or unaligned with the RF channel depending on a puncturing scheme associated with the PBCH of SSB 480. To illustrate, in some implementations, the reference frequency of identified synchronization bandwidth 406 is the same as the reference frequency of the RF channel (e.g., the synchronization raster point and the channel raster point are the same). Alternatively, the reference frequency of identified synchronization bandwidth 406 and the reference frequency of the RF channel may be different. As a non-limiting example, the two reference frequencies may be separated by one or two physical resource blocks (PRBs) (e.g., the reference frequency of identified synchronization bandwidth 406 may be offset to either side of the reference frequency of the RF channel by one or two PRBs in the frequency domain).

In some implementations, UE 115 may determine a channel bandwidth of a communication channel that includes SSB 480, and is to be used for communications with base station 105, based on whether identified synchronization bandwidth 406 is in a subset of bandwidths that corresponds to the wider spectrum SSB configuration (e.g., corresponding to channel bandwidths that are 5 MHz or greater) or a subset of bandwidths that corresponds to the narrow spectrum SSB configuration (e.g., corresponding to channel bandwidths that less than 5 MHz, such as 3 MHz). For example, UE 115 may determine the channel bandwidth to be 5 MHz or greater if the reference frequency of identified synchronization bandwidth 406 is included in first reference frequencies 412. Alternatively, UE 115 may determine the channel bandwidth to be less than 5 MHz if the reference frequency of identified synchronization bandwidth 406 is included in second reference frequencies 414.

To enable channel acquisition by wireless devices such as UE 115, base station 105 may select a synchronization bandwidth via which to transmit SSB 480. If base station 105 does not broadcast SSB information to surrounding devices, base station 105 may determine to select a synchronization bandwidth (e.g., selected synchronization bandwidth 462) for transmitting SSB 480 from among multiple synchronization bandwidths indicated by mapping data 466. To illustrate, base station 105 may select selected synchronization bandwidth 462 from a plurality of bandwidths that include a first subset of bandwidths corresponding to the wider spectrum SSB configuration and a second subset of bandwidths corresponding to the narrow spectrum SSB configuration, similar as to described with reference to mapping data 410. Selected synchronization bandwidth 462 may be selected from one of the two subsets based on a comparison of a channel bandwidth of one or more communication channels to be used for wireless communication to a threshold. For example, base station 105 may select from candidate bandwidths having first reference frequencies 468 based on the channel bandwidth being greater than or equal to a threshold. Alternatively, base station 105 may select from candidate bandwidths having second reference frequencies 470 based on the channel bandwidth being less than the threshold. In some implementations, the threshold is 5 MHz (e.g., the difference between the narrow spectrum and the wider spectrum described herein). In other implementations, the threshold may be a different value if the SSB configurations correspond to differently sized channels.

To determine which bandwidth to select for transmission of SSB 480, base station 105 may access mapping data 466 based on operating band 464 and the comparison of the channel bandwidth to the threshold to select a plurality of candidate bandwidths from which selected synchronization bandwidth 462 may be chosen. For example, base station 105 may access mapping data 466 to identify first reference frequencies 468 that are mapped to operating band 464 in a first portion of mapping data 466 that corresponds to the wider spectrum SSB configuration as candidate reference frequencies if the channel bandwidth is greater than or equal to the threshold. Alternatively, base station 105 may access mapping data 466 to identify second reference frequencies 470 that are mapped to operating band 464 in a second portion of mapping data 466 that corresponds to the narrow spectrum SSB configuration as candidate reference frequencies if the channel bandwidth is less than the threshold. As an illustrative example, if operating band 464 is band n26 and the channel bandwidth is greater than or equal to the threshold, base station 105 may select reference frequencies corresponding to GSCNs 2153-2230 as first reference frequencies 468 (e.g., candidate reference frequencies for selected synchronization bandwidth 462) based on table 610 of FIG. 6. Alternatively, if operating band 464 is band n26 and the channel bandwidth is less than the threshold, base station 105 may select reference frequencies corresponding to GSCNs 34165-34242 for second reference frequencies 470 (e.g., candidate reference frequencies for selected synchronization bandwidth 462) based on table 710 of FIG. 7. Base station 105 may select a particular bandwidth from the selected subset of reference frequencies based on parameters or characteristics of base station 105, communications to be performed by base station 105, channel conditions, or any other criteria. In some implementations, some operating bands may only be associated with one type of communication channel (e.g., the narrow spectrum or the wider spectrum), and thus base station 105 may choose selected synchronization bandwidth 462 from only one of first reference frequencies 468 or second reference frequencies 470 based on operating band 464. Alternatively, both types of communication channels may be used on any or all operating bands, and base station 105 may choose selected synchronization bandwidth from first reference frequencies 468 or second reference frequencies 470 based on a target channel bandwidth.

After selected synchronization bandwidth 462 has been selected, base station may transmit SSB 480 via selected synchronization bandwidth. Because mapping data that is stored at other wireless communication devices is the same as mapping data 466 stored at base station 105, other wireless communication devices may be able to scan one or more candidate synchronization bandwidths that include selected synchronization bandwidth 462, thereby detecting SSB 480 and enabling system acquisition operations. For example, because mapping data 410 at UE 115 and mapping data 466 at base station 105 indicate the same mapping, UE 115 may perform the above-described scanning process to detect SSB 480 (e.g., after detection of SSB 480, identified synchronization bandwidth 406 is the same as selected synchronization bandwidth 462), thus enabling UE 115 to receive SSB 480 and perform system acquisition with base station 105.

As described with reference to FIG. 4, the present disclosure provides techniques for supporting SSB configuration for narrow spectrum. For example, the techniques described above enable the same overall SSB design to be extended to use for narrow spectra, such as less than 5 MHz, which may not be wide enough to support an entirety of the SSB, without requiring puncturing of the PSS or SSS and with support for globally defined channel reference frequencies (e.g., channel raster points). To illustrate, additional reference frequencies (e.g., synchronization raster points), such as second reference frequencies 414 and second reference frequencies 470, may be defined that do not overlap with other existing reference frequencies, such as first reference frequencies 412 and first reference frequencies 468, and that are less sparsely located than the existing reference frequencies. By defining a second set of synchronization raster points that are more closely spaced in frequency as part of a narrow spectrum SSB configuration, base station 105 is provided with one or more candidate bandwidths at which to locate SSB 480 such that the synchronization signals within (e.g., the PSS and the SSS) are not punctured by the narrower bandwidth of the narrow spectrum (e.g., a 3 MHz channel). This enables UEs that are capable of communicating via the reduced spectrum, such as UE 115, to perform system acquisition using the techniques already designed for 5G networks in wider spectra with few operational changes or additional complexity. As such, wireless communication system 400 can support both the narrow spectrum SSB configuration and the wider spectrum SSB configuration, thereby extending 5G support to owners of narrow communication spectra without losing support for legacy devices (e.g., devices that only support the wider SSB configuration). Additionally, some implementations described herein leverage other existing configurations, such as a global channel raster, to enable the techniques described herein by using existing configurations instead of defining entirely new ones, thereby reducing the memory footprint and complexity of implementing the narrow SSB configuration. For example, second reference frequencies 414 and 470 may be defined with respect to $N_{REF}$ frequency values on the global frequency channel raster that are indexed by NR-ARFCNs, thereby requiring fewer modifications than defining entirely new reference frequency and GSCN combinations.

Figure 9:
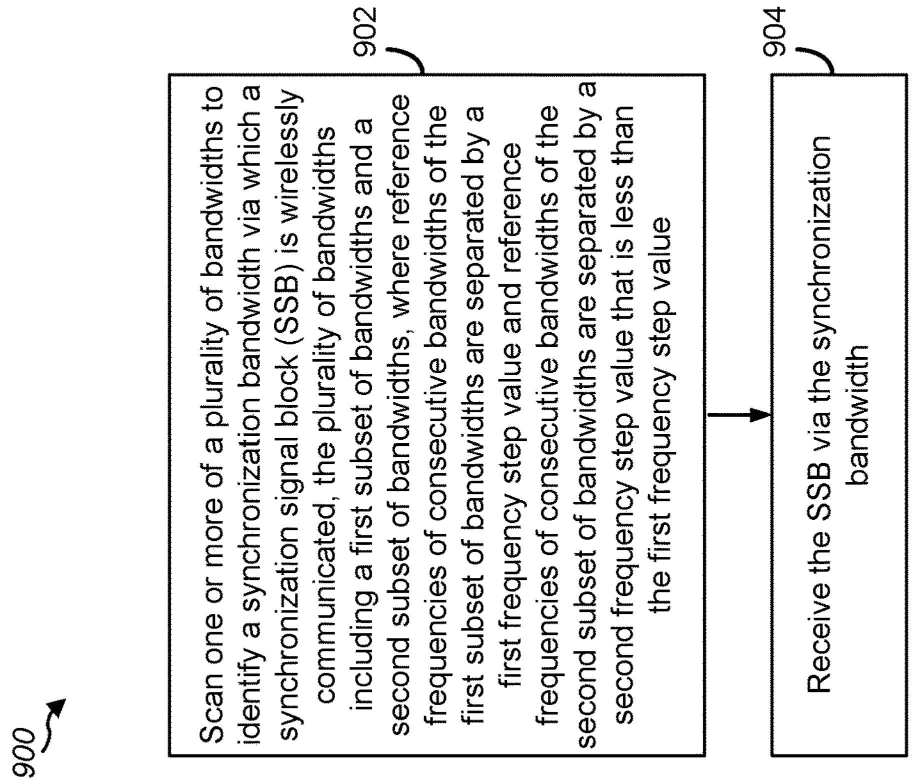
FIG. 9 is a flow diagram illustrating an example process that supports SSB configuration for narrow spectrum according to one or more aspects.

FIG. 9 is a flow diagram illustrating an example process 900 that supports SSB configuration for narrow spectrum according to one or more aspects. Operations of process 900 may be performed by a UE, such as UE 115 described above with reference to FIGS. 1-4, or a UE described with reference to FIG. 10. For example, example operations (also referred to as "blocks") of process 900 may enable UE 115 to support SSB configuration for narrow spectrum.

In block 902, the UE scans one or more of a plurality of bandwidths to identify a synchronization bandwidth via which a SSB is wirelessly communicated. For example, the synchronization bandwidth may include or correspond to identified synchronization bandwidth 406 of FIG. 4 and the SSB may include or correspond to SSB 480 of FIG. 4. The plurality of bandwidths include a first subset of bandwidths and a second subset of bandwidths. For example, the first subset of bandwidths may include or correspond to bandwidths having reference frequencies indicated by first reference frequencies 412 of FIG. 4 and the second subset of bandwidths may include or correspond to bandwidths having reference frequencies indicated by second reference frequencies 414 of FIG. 4. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. For example, consecutive reference frequencies of first reference frequencies 412 may be separated by a first frequency step value, and consecutive reference frequencies of second reference frequencies 414 may be separated by a second frequency step value that is less than the first frequency step value. In some implementations, the first frequency step value is approximately 1200 kHz (e.g., 1200 kHz or 1200 kHz plus or minus 100 or 200 kHz) and the second frequency step value is 100 kHz. In block 904, the UE receives the SSB via the synchronization bandwidth. For example, UE 115 of FIG. 4 may receive SSB 480 via identified synchronization bandwidth 406.

In some implementations, process 900 further includes the UE determining a channel bandwidth of a communication channel that includes the SSB based on whether the synchronization bandwidth is in the first subset of bandwidths or the second subset of bandwidths. The first subset of bandwidths correspond to channel bandwidths that are 5 MHz or greater and the second subset of bandwidths correspond to channel bandwidths that are less than 5 MHz. For example, UE 115 may determine a channel bandwidth to be greater than or equal to 5 MHz or less than 5 MHz based on whether a reference frequency of identified synchronization bandwidth 406 is included within first reference frequencies 412 or second reference frequency 414.

In some implementations, the UE stores preconfigured mapping data that indicates a mapping between a group of operating bands and reference frequencies of candidate synchronization bandwidths. For example, the preconfigured mapping data may include or correspond to mapping data 410 of FIG. 4. The mapping may be defined by a wireless communication standard, such as a 5G NR wireless communication standard. In some implementations, process 900 also includes accessing the preconfigured mapping data based on an operating band of the UE to select the plurality of bandwidths from the candidate synchronization bandwidths. For example, the operating band may include or correspond to operating band 408 of FIG. 4. As illustrative, non-limiting examples, the operating band may include band n8, band n26, band n28, or band n100.

In some such implementations involving the preconfigured mapping data, first index values corresponding to reference frequencies of the first subset of bandwidths are less than second index values corresponding to reference frequencies of the second subset of bandwidths. For example, GSCNs for FR1 of the wider spectrum SSB configuration, as shown in FIG. 6, are less than GSCNs for FR1 of the narrow spectrum SSB configuration, as shown in FIG. 7. In some such implementations, consecutive index values of the first index values and consecutive index values of the second index values are separated by a same step size.

For example, as shown in FIGS. 6 and 7, GSCNs for FR1 of both SSB configurations are separated by a step size of one.

In some other implementations involving the preconfigured mapping data, second index values corresponding to reference frequencies of the second subset of bandwidths include a subset of channel index values corresponding to globally defined RF channels. For example, GSCNs for reference frequencies of FR1 of the narrow spectrum configuration may correspond to a subset of NR-ARFCNs, as described with reference to FIG. 8. Consecutive index values of first index values corresponding to reference frequencies of the first subset of bandwidths may be separated by a first step size and consecutive index values of second index values corresponding to reference frequencies of the second subset of bandwidths may be separated by a second step size that is different than the first step size. For example, the first step size may be one, as shown in FIG. 6, and the second step size may be twenty, as shown in FIG. 8. In some such implementations, reference frequencies for the second subset of bandwidths are equal to the corresponding index value multiplied by 5 kHz and the channel index values are NR-ARFCNs, as shown in FIG. 8.

In some implementations, the synchronization bandwidth is located within a RF channel having a reference frequency located at one of a plurality of channel reference frequencies. For example, frequency resources allocated to identified synchronization bandwidth 406 of FIG. 4 may be a subset of frequency resources allocated to a RF channel, as further described with reference to FIG. 5. Consecutive channel reference frequencies of the plurality of channel reference frequencies may be separated by the second frequency step value. For example, the frequency step size of reference frequencies (e.g., synchronization raster points) for the narrow spectrum SSB configuration of FIGS. 7 and 8 may be the same as for the global channel raster frequency step size (e.g., 100 kHz). In some such implementations, process 900 may further include the UE monitoring the RF channel after identifying the synchronization bandwidth, and receipt of the SSB via the synchronization bandwidth may be responsive to monitoring the RF channel. For example, frequency resources allocated to identified synchronization bandwidth 406 may be a subset of frequency resources allocated to a RF channel, such that receipt of SSB 480 is responsive to monitoring the RF channel by UE 115. Additionally or alternatively, the reference frequency of the RF channel may be the same as a reference frequency of the synchronization bandwidth. For example, identified synchronization bandwidth 406 may be aligned in frequency with the RF channel, as shown in FIG. 5. Alternatively, a reference frequency of the synchronization bandwidth and the reference frequency of the RF channel may be separated by one or two PRBs. For example, the reference frequency of identified synchronization bandwidth 406 may be offset in frequency, to the left or right, of the reference frequency of the RF channel (e.g., the channel raster point) by one or more RBs based on a puncturing scheme associated with receiving a PBCH included in SSB 480.

Figure 10:
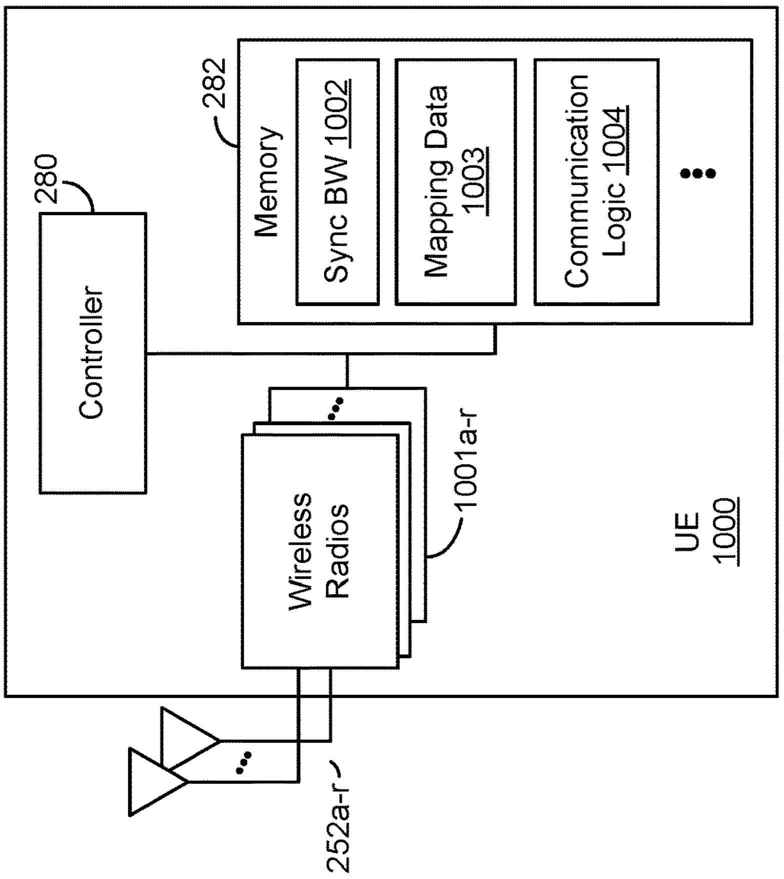
FIG. 10 is a block diagram of an example UE that supports SSB configuration for narrow spectrum according to one or more aspects.

FIG. 10 is a block diagram of an example UE 1000 that supports SSB configuration for narrow spectrum according to one or more aspects. UE 1000 may be configured to perform operations, including the blocks of a process described with reference to FIG. 9. In some implementations, UE 1000 includes the structure, hardware, and components shown and described with reference to UE 115 of FIGS. 1-4. For example, UE 1000 includes controller 280, which operates to execute logic or computer instructions stored in memory 282, as well as controlling the components of UE 1000 that provide the features and functionality of UE 1000. UE 1000, under control of controller 280, transmits and receives signals via wireless radios 1001*a-r* and antennas 252*a-r*. Wireless radios 1001*a-r* include various components and hardware, as illustrated in FIG. 2 for UE 115, including modulator and demodulators 254*a-r*, MIMO detector 256, receive processor 258, transmit processor 264, and TX MIMO processor 266.

Figure 12:
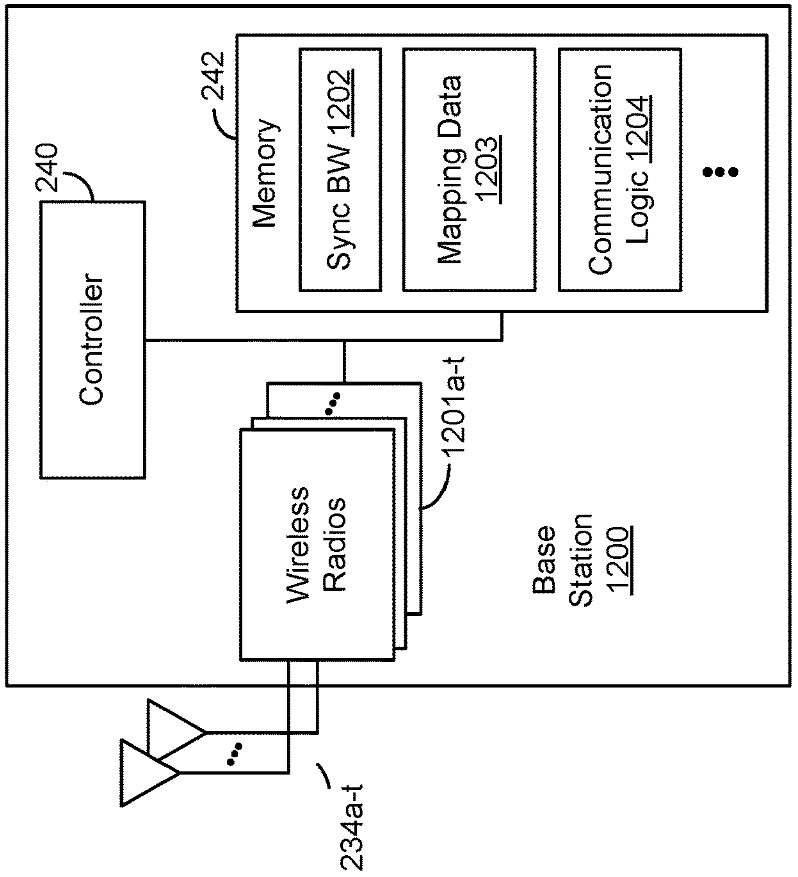
FIG. 12 is a block diagram of an example base station that supports SSB configuration for narrow spectrum according to one or more aspects.

As shown, memory 282 may include synchronization bandwidth 1002, mapping data 1003, and communication logic 1004. Synchronization bandwidth 1002 may include one or more parameters of an identified synchronization bandwidth for receiving an SSB. For example, synchronization bandwidth 1002 may include or correspond to identified synchronization bandwidth 406 of FIG. 4. Mapping data 1003 mama operating bands to corresponding candidate reference frequencies (e.g., sync raster points) for wider spectrum, for narrow spectrum, or for both. For example, mapping data 1003 may include or correspond to mapping data 410 of FIG. 4. Communication logic 1004 may be configured to enable communication between UE 1000 and one or more other devices. UE 1000 may receive signals from or transmit signals to one or more network entities, such as base station 105 of FIGS. 1-4 or a base station as illustrated in FIG. 12.

Figure 11:
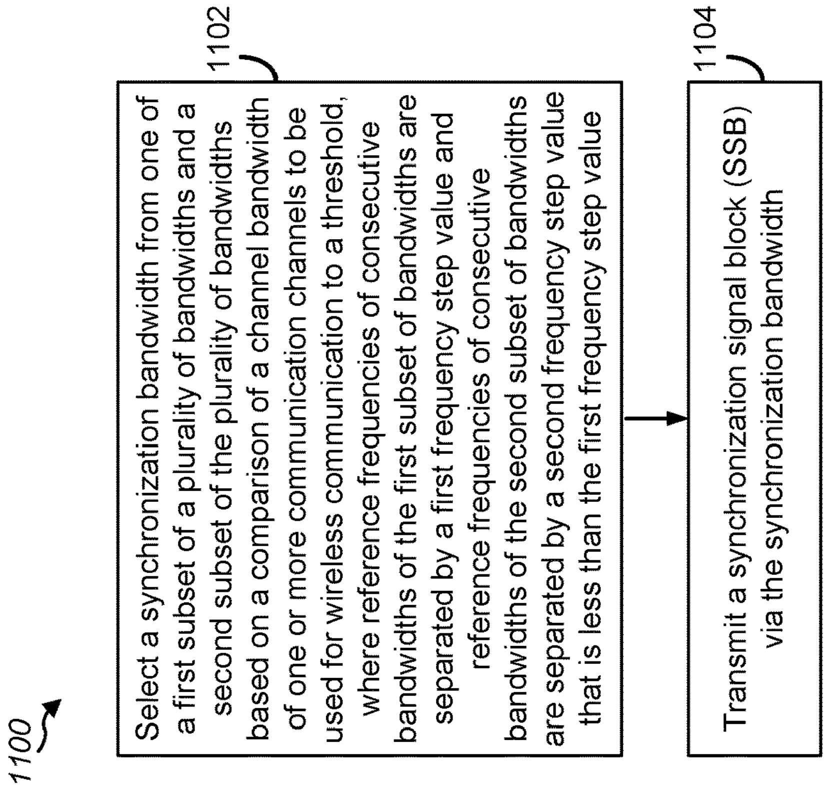
FIG. 11 is a flow diagram illustrating an example process that supports SSB configuration for narrow spectrum according to one or more aspects.

FIG. 11 is a flow diagram illustrating an example process 1100 that supports SSB configuration for narrow spectrum according to one or more aspects. Operations of process 1100 may be performed by a base station, such as base station 105 described above with reference to FIGS. 1-4 or a base station as described below with reference to FIG. 12. For example, example operations of process 1100 may enable base station 105 to support SSB configuration for narrow spectrum.

At block 1102, the base station selects a synchronization bandwidth from one of a first subset of a plurality of bandwidths and a second subset of the plurality of bandwidths based on a comparison of a channel bandwidth of one or more communication channels to be used for wireless communication to a threshold. For example, the synchronization bandwidth may include or correspond to selected synchronization bandwidth 462 of FIG. 4, the first subset may include or correspond to bandwidths having reference frequencies indicated by first reference frequencies 468 of FIG. 4, and the second subset may include or correspond to bandwidths having reference frequencies indicated by second reference frequencies 470 of FIG. 4. In some implementations, the channel bandwidth is approximately 3 MHz. In some implementations, the threshold is 5 MHz. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. In some implementations, the first frequency step value is approximately 1200 kHz and the second frequency step value is 100 kHz. At block 1104, the base station transmits a SSB via the synchronization bandwidth. For example, the SSB may include or correspond to the SSB 480 of FIG. 4 that is transmitted by base station 105 via selected synchronization bandwidth 462.

In some implementations, selecting the synchronization bandwidth includes selecting the synchronization bandwidth from the first subset of bandwidths based on the channel bandwidth being greater than or equal to the threshold. For example, selected synchronization bandwidth 462 may be selected from bandwidths having first reference frequencies 468 based on the channel bandwidth being greater than or equal to 5 MHz. Alternatively, selecting the synchronization bandwidth may include selecting the synchronization bandwidth from the second subset of bandwidths based on the channel bandwidth being less than the threshold. For example, selected synchronization bandwidth 462 may be selected from bandwidths having second reference frequencies 470 based on the channel bandwidth being less than 5 MHz.

In some implementations, process 1100 further includes the base station accessing preconfigured mapping data based on an operating band of the base station to select the plurality of bandwidths from candidate synchronization bandwidths. For example, the preconfigured mapping data may include or correspond to mapping data 466 of FIG. 4, and the operating band may include or correspond to operating band 464 of FIG. 4. The preconfigured mapping data may indicate a mapping between the group of operating bands and reference frequencies of the candidate synchronization bandwidths, as described above with reference to FIGS. 6-8. The mapping may be defined by a wireless communication standard, such as a 5G NR wireless communication standard.

In some such implementations, first index values corresponding to reference frequencies of the first subset of bandwidths are less than second index values corresponding to reference frequencies of the second subset of bandwidths. For example, GSCNs for FR1 of the wider spectrum SSB configuration, as shown in FIG. 6, are less than GSCNs for FR1 of the narrow spectrum SSB configuration, as shown in FIG. 7. Consecutive index values of the first index values and consecutive index values of the second index values may be separated by a same step size. For example, as shown in FIGS. 6 and 7, GSCNs for FR1 of both SSB configurations are separated by a step size of one. In some other implementations, second index values corresponding to reference frequencies of the second subset of bandwidths include a subset of channel index values corresponding to globally defined RF channels. For example, GSCNs for reference frequencies of FR1 of the narrow spectrum configuration may correspond to a subset of NR-ARFCNs, as described with reference to FIG. 8. Consecutive index values of first index values corresponding to reference frequencies of the first subset of bandwidths may be separated by a first step size and consecutive index values of second index values corresponding to reference frequencies of the second subset of bandwidths may be separated by a second step size that is different than the first step size. For example, the first step size may be one, as shown in FIG. 6, and the second step size may be twenty, as shown in FIG. 8. In some such implementations, reference frequencies for the second subset of bandwidths are equal to the corresponding index value multiplied by 5 kHz and the channel index values are NR-ARFCNs, as shown in FIG. 8.

In some implementations, the SSB is transmitted within a RF channel having a reference frequency located at one of a plurality of channel reference frequencies. For example, frequency resources allocated to selected synchronization bandwidth 462 of FIG. 4 may be a subset of frequency resources allocated to a RF channel, as further described with reference to FIG. 5. Consecutive channel reference frequencies of the plurality of channel reference frequencies may be separated by the second frequency step value. For example, the frequency step size of reference frequencies (e.g., synchronization raster points) for the narrow spectrum SSB configuration of FIGS. 7 and 8 may be the same as the global channel raster frequency step size (e.g., 100 kHz). In some such implementations, the reference frequency of the RF channel is the same as a reference frequency of the synchronization bandwidth. For example, identified synchronization bandwidth 406 may be aligned in frequency with the RF channel, as shown in FIG. 5. Alternatively, a reference frequency of the synchronization bandwidth and the reference frequency of the RF channel may be separated by one or two PRBs. For example, the reference frequency of selected synchronization bandwidth 462 may be offset in frequency, to the left or right, of the reference frequency of the RF channel by one or more RBs based on a puncturing scheme associated with receiving the PBCH included in SSB 480.

FIG. 12 is a block diagram of an example base station 1200 that supports SSB configuration for narrow spectrum according to one or more aspects. Base station 1200 may be configured to perform operations, including the blocks of process 1100 described with reference to FIG. 11. In some implementations, base station 1200 includes the structure, hardware, and components shown and described with reference to base station 105 of FIGS. 1-4. For example, base station 1200 may include controller 240, which operates to execute logic or computer instructions stored in memory 242, as well as controlling the components of base station 1200 that provide the features and functionality of base station 1200. Base station 1200, under control of controller 240, transmits and receives signals via wireless radios 1201*a-t* and antennas 234*a-t*. Wireless radios 1201*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include synchronization bandwidth 1202, mapping data 1203, and communication logic 1204. Synchronization bandwidth 1202 may include one or more parameters of a selected synchronization bandwidth for transmitting an SSB. For example, synchronization bandwidth 1202 may include or correspond to selected synchronization bandwidth 462 of FIG. 4. Mapping data 1203 mama operating bands to corresponding candidate reference frequencies (e.g., sync raster points) for wider spectrum, for narrow spectrum, or for both. For example, mapping data 1203 may include or correspond to mapping data 466 of FIG. 4. Communication logic 1204 may be configured to enable communication between base station 1200 and one or more other devices. Base station 1200 may receive signals from or transmit signals to one or more UEs, such as UE 115 of FIGS. 1-4 or UE 1000 of FIG. 10.

It is noted that one or more blocks (or operations) described with reference to FIGS. 9 and 11 may be combined with one or more blocks (or operations) described with reference to another of the figures. For example, one or more blocks (or operations) of FIG. 9 may be combined with one or more blocks (or operations) of FIG. 11. As another example, one or more blocks associated with FIGS. 9 and 11 may be combined with one or more blocks (or operations) associated with FIGS. 1-4. Additionally, or alternatively, one or more operations described above with reference to FIGS. 1-4 may be combined with one or more operations described with reference to FIG. 10 or 12.

In one or more aspects, techniques for supporting SSB configuration for narrow spectrum may include additional aspects, such as any single aspect or any combination of aspects described below or in connection with one or more other processes or devices described elsewhere herein. In a first aspect, techniques for supporting SSB configuration for narrow spectrum may include scanning one or more of a plurality of bandwidths to identify a synchronization bandwidth via which a SSB is wirelessly communicated. The plurality of bandwidths include a first subset of bandwidths and a second subset of bandwidths. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The techniques may further include receiving the SSB via the synchronization bandwidth. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the techniques further include determining a channel bandwidth of a communication channel that includes the SSB based on whether the synchronization bandwidth is in the first subset of bandwidths or the second subset of bandwidths. The first subset of bandwidths correspond to channel bandwidths that are 5 MHz or greater and the second subset of bandwidths corresponding to channel bandwidths that are less than 5 MHz.

In a third aspect, in combination with one or more of the first aspect or the second aspect, the first frequency step value is approximately 1200 kHz and the second frequency step value is 100 kHz.

In a fourth aspect, in combination with one or more of the first aspect through the third aspect, the UE stores preconfigured mapping data that indicates a mapping between a group of operating bands and reference frequencies of candidate synchronization bandwidths. The mapping is defined by a wireless communication standard.

In a fifth aspect, in combination with the fourth aspect, first index values corresponding to reference frequencies of the first subset of bandwidths are less than second index values corresponding to reference frequencies of the second subset of bandwidths. Consecutive index values of the first index values and consecutive index values of the second index values are separated by a same step size.

In a sixth aspect, in combination with the fifth aspect, the same step size is one.

In a seventh aspect, in combination with the fourth aspect, second index values corresponding to reference frequencies of the second subset of bandwidths include a subset of channel index values corresponding to globally defined RF channels. Consecutive index values of first index values corresponding to reference frequencies of the first subset of bandwidths are separated by a first step size and consecutive index values of second index values corresponding to reference frequencies of the second subset of bandwidths are separated by a second step size that is different than the first step size.

In an eighth aspect, in combination with the seventh aspect, the first step size is one and the second step size is twenty.

In a ninth aspect, in combination with one or more of the seventh aspect through the eighth aspect, reference frequencies for the second subset of bandwidths are equal to the corresponding index value multiplied by 5 kHz. The channel index values are NR-ARFCNs.

In a tenth aspect, in combination with one or more of the fourth aspect through the ninth aspect, the techniques further include accessing the preconfigured mapping data based on an operating band of the UE to select the plurality of bandwidths from the candidate synchronization bandwidths.

In an eleventh aspect, in combination with the tenth aspect, the operating band includes band n8, band n26, band n28, or band n100.

In a twelfth aspect, in combination with one or more of the first aspect through the eleventh aspect, the synchronization bandwidth is located within a RF channel having a reference frequency located at one of a plurality of channel reference frequencies. Consecutive channel reference frequencies of the plurality of channel reference frequencies are separated by the second frequency step value.

In a thirteenth aspect, in combination with the twelfth aspect, the techniques further include monitoring the RF channel after identifying the synchronization bandwidth. Receipt of the SSB via the synchronization bandwidth is responsive to monitoring the RF channel.

In a fourteenth aspect, in combination with one or more of the twelfth aspect through the thirteenth aspect, the reference frequency of the RF channel is the same as a reference frequency of the synchronization bandwidth.

In a fifteenth aspect, in combination with one or more of the twelfth aspect through the thirteenth aspect, a reference frequency of the synchronization bandwidth and the reference frequency of the RF channel are separated by one or two PRBs.

In one or more aspects, techniques for supporting SSB configuration for narrow spectrum may include additional aspects, such as any single aspect or any combination of aspects described below or in connection with one or more other processes or devices described elsewhere herein. In a sixteenth aspect, techniques for supporting SSB configuration for narrow spectrum may include selecting a synchronization bandwidth from one of a first subset of a plurality of bandwidths and a second subset of the plurality of bandwidths based on a comparison of a channel bandwidth of one or more communication channels to be used for wireless communication to a threshold. Reference frequencies of consecutive bandwidths of the first subset of bandwidths are separated by a first frequency step value and reference frequencies of consecutive bandwidths of the second subset of bandwidths are separated by a second frequency step value that is less than the first frequency step value. The techniques may further include transmitting a SSB via the synchronization bandwidth. In some examples, the techniques in the sixteenth aspect may be implemented in a method or process. In some other examples, the techniques of the sixteenth aspect may be implemented in a wireless communication device, such as network entity, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a seventeenth aspect, in combination with the sixteenth aspect, selecting the synchronization bandwidth includes selecting the synchronization bandwidth from the first subset of bandwidths based on the channel bandwidth being greater than or equal to the threshold.

In an eighteenth aspect, in combination with one or more of the sixteenth aspect through the seventeenth aspect, selecting the synchronization bandwidth includes selecting the synchronization bandwidth from the second subset of bandwidths based on the channel bandwidth being less than the threshold.

In a nineteenth aspect, in combination with one or more of the sixteenth aspect through the eighteenth aspect, the threshold is 5 MHz.

In a twentieth aspect, in combination with one or more of the sixteenth aspect through the nineteenth aspect, the first frequency step value is approximately 1200 kHz and the second frequency step value is 100 kHz.

In a twenty-first aspect, in combination with one or more of the sixteenth aspect through the twentieth aspect, the techniques further include accessing preconfigured mapping data based on an operating band of the network entity to select the plurality of bandwidths from candidate synchronization bandwidths. The preconfigured mapping data indicates a mapping between the group of operating bands and reference frequencies of the candidate synchronization bandwidths. The mapping is defined by a wireless communication standard.

In a twenty-second aspect, in combination with the twenty-first aspect, first index values corresponding to reference frequencies of the first subset of bandwidths are less than second index values corresponding to reference frequencies of the second subset of bandwidths. Consecutive index values of the first index values and consecutive index values of the second index values are separated by a same step size.

In a twenty-third aspect, in combination with the twenty-first aspect, second index values corresponding to reference frequencies of the second subset of bandwidths include a subset of channel index values corresponding to globally defined RF channels. Consecutive index values of first index values corresponding to reference frequencies of the first subset of bandwidths are separated by a first step size and consecutive index values of second index values corresponding to reference frequencies of the second subset of bandwidths are separated by a second step size that is different than the first step size.

In a twenty-fourth aspect, in combination with the twenty-third aspect, reference frequencies for the second subset of bandwidths are equal to the corresponding index value multiplied by 5 kHz. The channel index values are NR-ARFCNs.

In a twenty-fifth aspect, in combination with one or more of the sixteenth aspect through the twenty-fourth aspect, at least a portion of the SSB is transmitted within a RF channel having a reference frequency located at one of a plurality of channel reference frequencies. Consecutive channel reference frequencies of the plurality of channel reference frequencies are separated by the second frequency step value.

In a twenty-sixth aspect, in combination with the twenty-fifth aspect, the reference frequency of the RF channel is the same as a reference frequency of the synchronization bandwidth.

In a twenty-seventh aspect, in combination with the twenty-fifth aspect, a reference frequency of the synchronization bandwidth and the reference frequency of the RF channel are separated by one or two PRBs.

In a twenty-eighth aspect, in combination with one or more of the sixteenth aspect through the twenty-seventh aspect, the first frequency step value is approximately 1200 kHz and the second frequency step value is 100 kHz. The channel bandwidth is approximately 3 MHz.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms “upper” and “lower” are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term “or,” when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, “or” as used in a list of items prefaced by “at least one of” indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage include 0.1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

scanning one or more of a plurality of bandwidths to identify a synchronization bandwidth via which a synchronization signal block (SSB) is wirelessly communicated, the plurality of bandwidths including a first subset of bandwidths and a second subset of bandwidths, wherein reference frequencies of consecutive bandwidths of the first subset of bandwidths are separated by a first frequency step value and reference frequencies of consecutive bandwidths of the second subset of bandwidths are separated by a second frequency step value that is less than the first frequency step value;

receiving the SSB via the synchronization bandwidth; and determining, based on whether the synchronization bandwidth is in a first subset of bandwidths or a second subset of bandwidths, a channel bandwidth of a communication channel that includes the SSB, the first subset of bandwidths corresponding to channel bandwidths that are 5 megahertz (MHz) or greater and the second subset of bandwidths corresponding to channel bandwidths that are less than 5 MHz.

2. The method of claim 1, wherein the first frequency step value is approximately 1200 kilohertz (kHz) and the second frequency step value is 100 kHz.

3. The method of claim 1, wherein the UE stores preconfigured mapping data that indicates a mapping between a group of operating bands and reference frequencies of candidate synchronization bandwidths, and wherein the mapping is defined by a wireless communication standard.

4. The method of claim 3, wherein first index values corresponding to reference frequencies of the first subset of bandwidths are less than second index values corresponding to reference frequencies of the second subset of bandwidths, and wherein consecutive index values of the first index values and consecutive index values of the second index values are separated by a same step size.

5. The method of claim 4, wherein the same step size is one.

6. The method of claim 3, wherein second index values corresponding to reference frequencies of the second subset of bandwidths comprise a subset of channel index values corresponding to globally defined radio frequency (RF) channels, wherein consecutive index values of first index values corresponding to reference frequencies of the first subset of bandwidths are separated by a first step size and consecutive index values of second index values corresponding to reference frequencies of the second subset of bandwidths are separated by a second step size that is different than the first step size.

7. The method of claim 6, wherein the first step size is one and the second step size is twenty.

8. The method of claim 6, wherein reference frequencies for the second subset of bandwidths are equal to the corresponding index value multiplied by 5 kilohertz (kHz), and wherein the channel index values are New Radio Absolute Radio Frequency Channel Numbers (NR-ARFCNs).

9. The method of claim 3, further comprising accessing the preconfigured mapping data based on an operating band of the UE to select the plurality of bandwidths from the candidate synchronization bandwidths.

10. The method of claim 9, wherein the operating band comprises band n8, band n26, band n28, or band n100.

11. A user equipment (UE) comprising:

a memory storing processor-readable code; and at least one processor coupled to the memory, the at least one processor configured to execute the processor-readable code to cause the at least one processor to:

scan one or more of a plurality of bandwidths to identify a synchronization bandwidth via which a synchronization signal block (SSB) is wirelessly communicated, the plurality of bandwidths including a first subset of bandwidths and a second subset of bandwidths, wherein reference frequencies of consecutive bandwidths of the first subset of bandwidths are separated by a first frequency step value and reference frequencies of consecutive bandwidths of the second subset of bandwidths are separated by a second frequency step value that is less than the first frequency step value;

receive the SSB via the synchronization bandwidth; and determine, based on whether the synchronization bandwidth is in a first subset of bandwidths or a second subset of bandwidths, a channel bandwidth of a communication channel that includes the SSB, the first subset of bandwidths corresponding to channel bandwidths that are 5 megahertz (MHz) or greater and the second subset of bandwidths corresponding to channel bandwidths that are less than 5 MHz.

12. The UE of claim 11, wherein the synchronization bandwidth is located within a radio frequency (RF) channel having a reference frequency located at one of a plurality of channel reference frequencies, and wherein consecutive channel reference frequencies of the plurality of channel reference frequencies are separated by the second frequency step value.

13. The UE of claim 12, wherein execution of the processor-readable code further causes the at least one processor to monitor the RF channel after identifying the synchronization bandwidth, and wherein receipt of the SSB via the synchronization bandwidth is responsive to monitoring the RF channel.

14. The UE of claim 12, wherein the reference frequency of the RF channel is the same as a reference frequency of the synchronization bandwidth.

15. The UE of claim 12, wherein a reference frequency of the synchronization bandwidth and the reference frequency of the RF channel are separated by one or two physical resource blocks (PRBs).

16. A method of wireless communication performed by a network entity, the method comprising:

selecting, based on whether a channel bandwidth of one or more communication channels to be used for wireless communication is greater than or equal to 5 megahertz (MHz) or less than 5 megahertz (MHz), a synchronization bandwidth from one of a first subset of a plurality of bandwidths and a second subset of the plurality of bandwidths, wherein reference frequencies of consecutive bandwidths of the first subset of bandwidths are separated by a first frequency step value and reference frequencies of consecutive bandwidths of the second subset of bandwidths are separated by a second frequency step value that is less than the first frequency step value; and transmitting a synchronization signal block (SSB) via the synchronization bandwidth.

17. The method of claim 16, wherein selecting the synchronization bandwidth comprises selecting the synchronization bandwidth from the first subset of bandwidths based on the channel bandwidth being greater than or equal to the threshold.

18. The method of claim 16, wherein selecting the synchronization bandwidth comprises selecting the synchronization bandwidth from the second subset of bandwidths based on the channel bandwidth being less than the threshold.

19. The method of claim 16, wherein the first frequency step value is approximately 1200 kilohertz (kHz) and the second frequency step value is 100 kHz.

20. The method of claim 16, further comprising accessing preconfigured mapping data based on an operating band of the network entity to select the plurality of bandwidths from candidate synchronization bandwidths, wherein the preconfigured mapping data indicates a mapping between a group of operating bands and reference frequencies of the candidate synchronization bandwidths, and wherein the mapping is defined by a wireless communication standard.

21. The method of claim 20, wherein first index values corresponding to reference frequencies of the first subset of bandwidths are less than second index values corresponding to reference frequencies of the second subset of bandwidths, and wherein consecutive index values of the first index values and consecutive index values of the second index values are separated by a same step size.

22. The method of claim 20, wherein second index values corresponding to reference frequencies of the second subset of bandwidths comprise a subset of channel index values corresponding to globally defined radio frequency (RF) channels, wherein consecutive index values of first index values corresponding to reference frequencies of the first subset of bandwidths are separated by a first step size and consecutive index values of second index values corresponding to reference frequencies of the second subset of bandwidths are separated by a second step size that is different than the first step size.

23. The method of claim 22, wherein reference frequencies for the second subset of bandwidths are equal to the corresponding index value multiplied by 5 kilohertz (kHz), and wherein the channel index values are New Radio Absolute Radio Frequency Channel Numbers (NR-ARFCNs).

24. A network entity comprising:

a memory storing processor-readable code; and at least one processor coupled to the memory, the at least one processor configured to execute the processor-readable code to cause the at least one processor to:

select, based on whether a channel bandwidth of one or more communication channels to be used for wireless communication is greater than or equal to 5 megahertz (MHz) or less than 5 megahertz (MHz), a synchronization bandwidth from one of a first subset of a plurality of bandwidths and a second subset of the plurality of bandwidths, wherein reference frequencies of consecutive bandwidths of the first subset of bandwidths are separated by a first frequency step value and reference frequencies of consecutive bandwidths of the second subset of bandwidths are separated by a second frequency step value that is less than the first frequency step value; and transmit a synchronization signal block (SSB) via the synchronization bandwidth.

25. The network entity of claim 24, wherein at least a portion of the SSB is transmitted within a radio frequency (RF) channel having a reference frequency located at one of a plurality of channel reference frequencies, and wherein consecutive channel reference frequencies of the plurality of channel reference frequencies are separated by the second frequency step value.

26. The network entity of claim 25, wherein the reference frequency of the RF channel is the same as a reference frequency of the synchronization bandwidth.

27. The network entity of claim 25, wherein a reference frequency of the synchronization bandwidth and the reference frequency of the RF channel are separated by one or two physical resource blocks (PRBs).

28. The network entity of claim 24, wherein the first frequency step value is approximately 1200 kilohertz (kHz) and the second frequency step value is 100 kHz, and wherein the channel bandwidth is approximately 3 MHz.

* * * * *